(12) United States Patent
Cury

(10) Patent No.: US 9,910,344 B2
(45) Date of Patent: Mar. 6, 2018

(54) IN-CEILING OR IN-WALL RETRACTING CAMERA PLATFORM SYSTEM

(71) Applicant: EarthCam, Inc., Upper Saddle River, NJ (US)

(72) Inventor: Brian Cury, Upper Saddle River, NJ (US)

(73) Assignee: EarthCam, Inc., Upper Saddle River, NJ (US)

( * ) Notice: Subject to any disclaimer, the term of this patent is extended or adjusted under 35 U.S.C. 154(b) by 0 days.

(21) Appl. No.: 15/248,170

(22) Filed: Aug. 26, 2016

(65) Prior Publication Data

US 2017/0075196 A1   Mar. 16, 2017

Related U.S. Application Data

(63) Continuation-in-part of application No. 14/500,143, filed on Sep. 29, 2014, now Pat. No. 9,429,821, which is a continuation-in-part of application No. 13/960,148, filed on Aug. 6, 2013, now Pat. No. 8,849,105.

(60) Provisional application No. 61/679,904, filed on Aug. 6, 2012.

(51) Int. Cl.
G03B 17/04 (2006.01)
G03B 17/56 (2006.01)
F16M 13/02 (2006.01)

(52) U.S. Cl.
CPC .......... *G03B 17/561* (2013.01); *F16M 13/02* (2013.01); *F16M 13/027* (2013.01); *G03B 17/04* (2013.01)

(58) Field of Classification Search
CPC combination set(s) only.
See application file for complete search history.

(56) References Cited

U.S. PATENT DOCUMENTS

| 7,874,744 | B2 | 1/2011 | Cirker |
| 8,000,588 | B1 | 8/2011 | Harvey |
| 8,137,009 | B2 | 3/2012 | Cirker |
| 2002/0081110 | A1 * | 6/2002 | Johnson ................. B64D 47/08 396/12 |
| 2009/0185036 | A1 | 7/2009 | Bowron |

* cited by examiner

*Primary Examiner* — Minh Phan
(74) *Attorney, Agent, or Firm* — Millen, White, Zelano & Branigan, P.C.; William Nixon

(57) ABSTRACT

A retractable camera platform system allows a mounted camera to be hidden while not in use. The system retracts a camera platform into a recess in the ceiling, wall and the like of a room, building, hallway or other structure. The system includes the camera platform that opens a lowering assembly having doors so that the camera may deploy when needed. The lowering assembly or cover hides the camera and the associated frame structure when not in use. Actuators and linear slide tracks raise and lower the camera as desired. The lowering assembly may be removed from the frame structure.

20 Claims, 35 Drawing Sheets

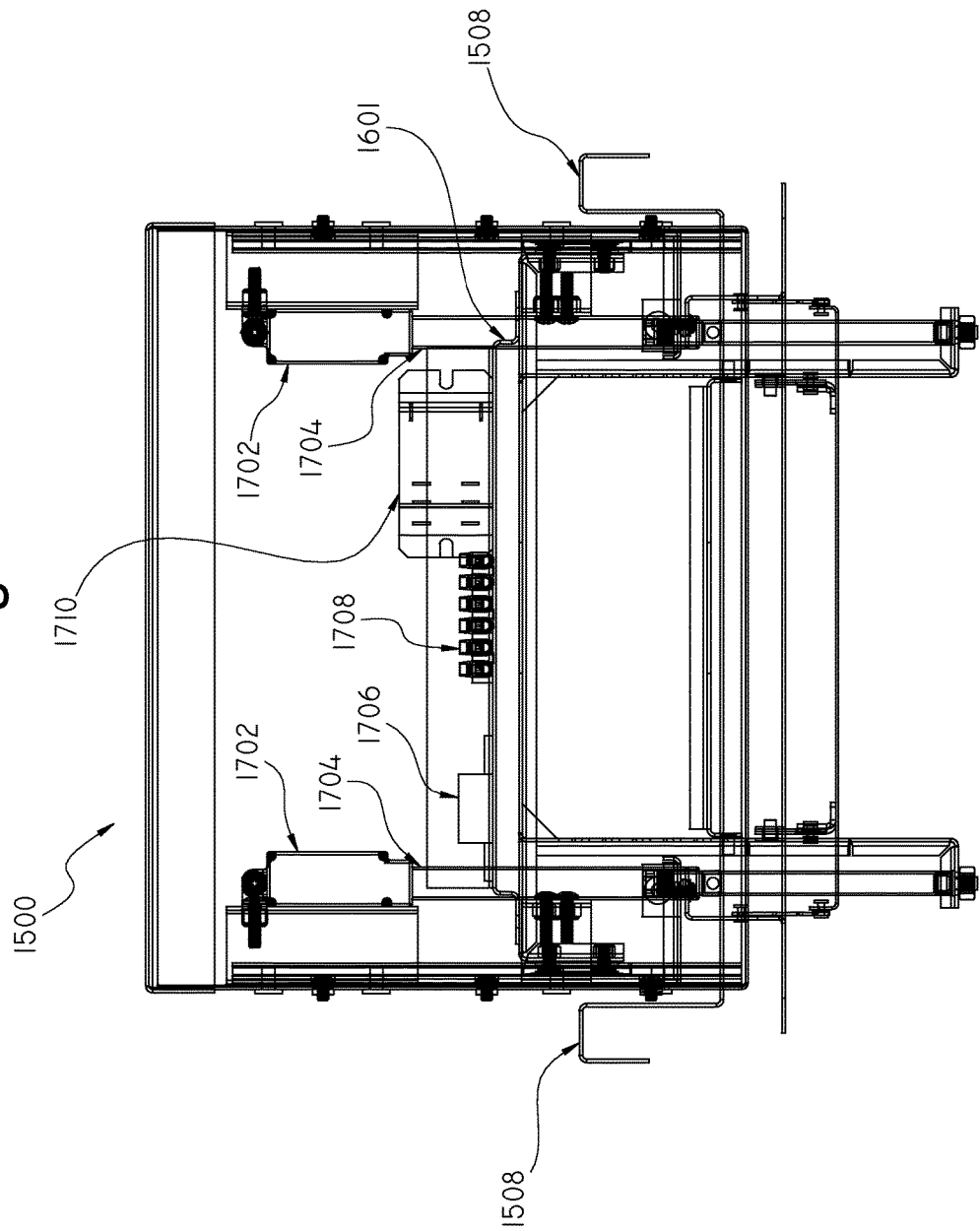

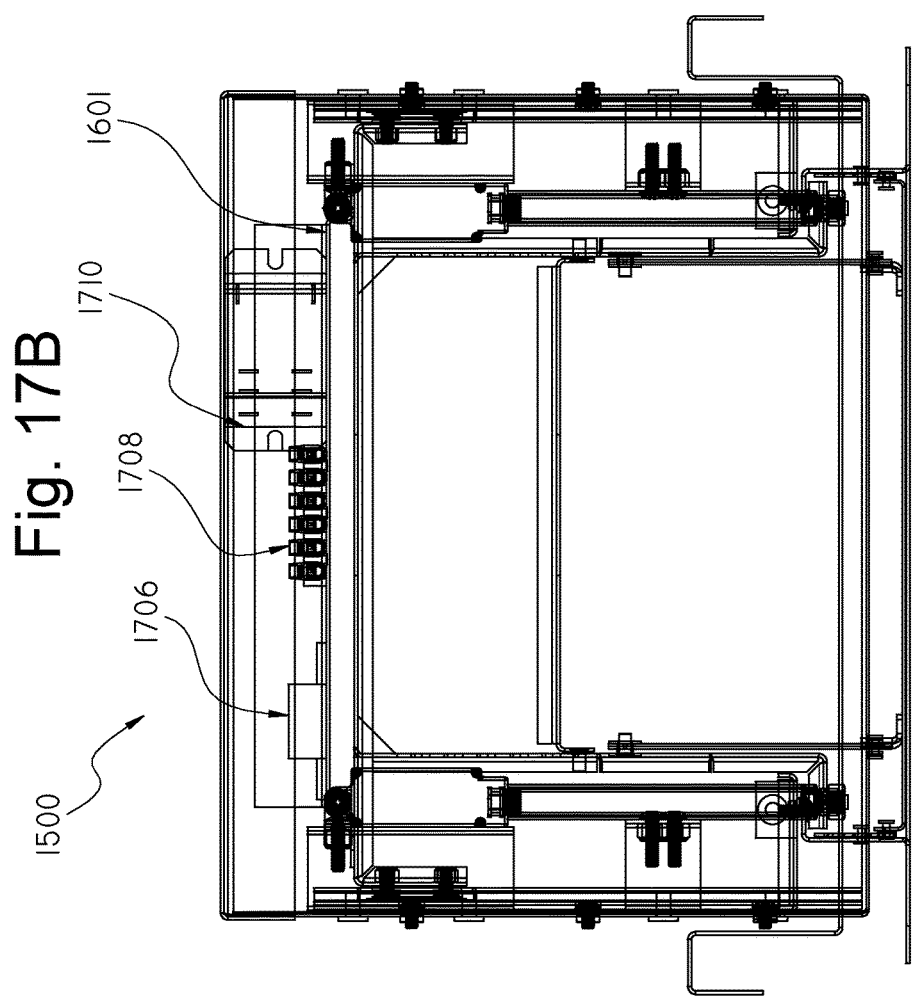

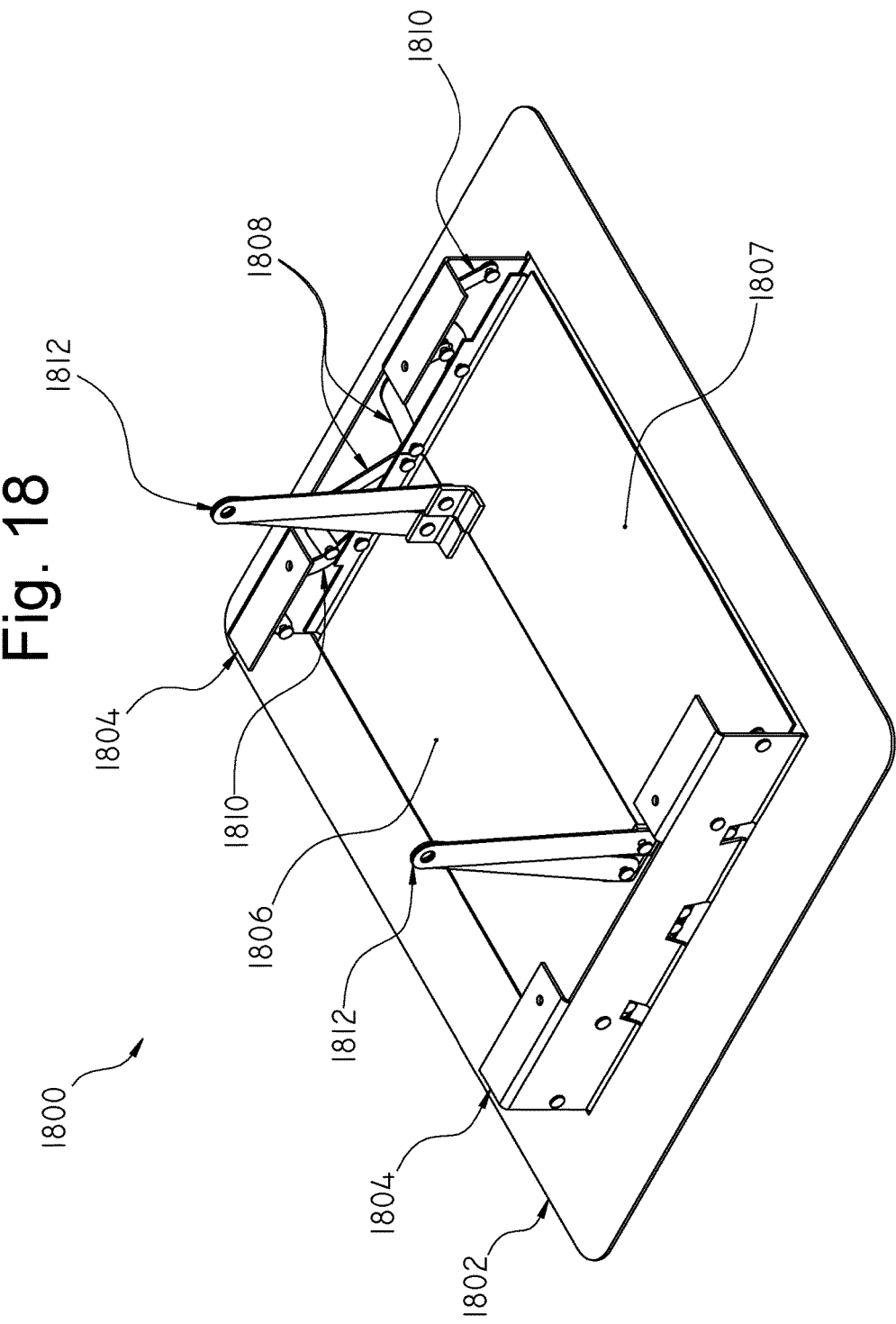

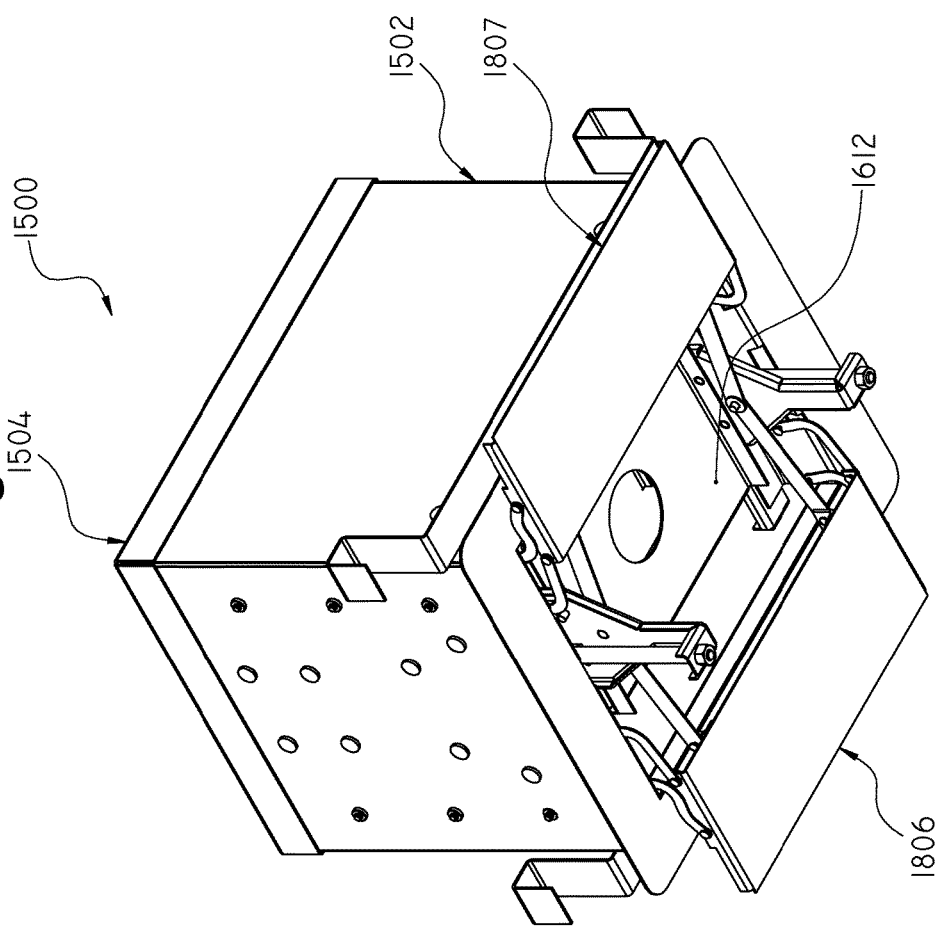

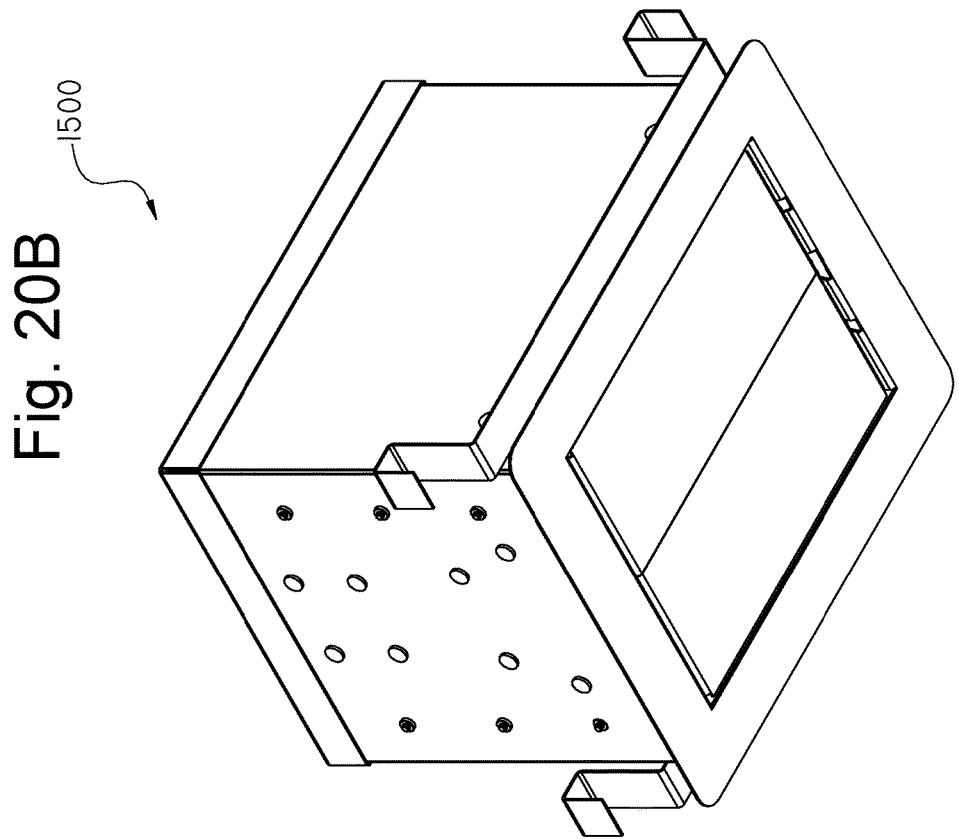

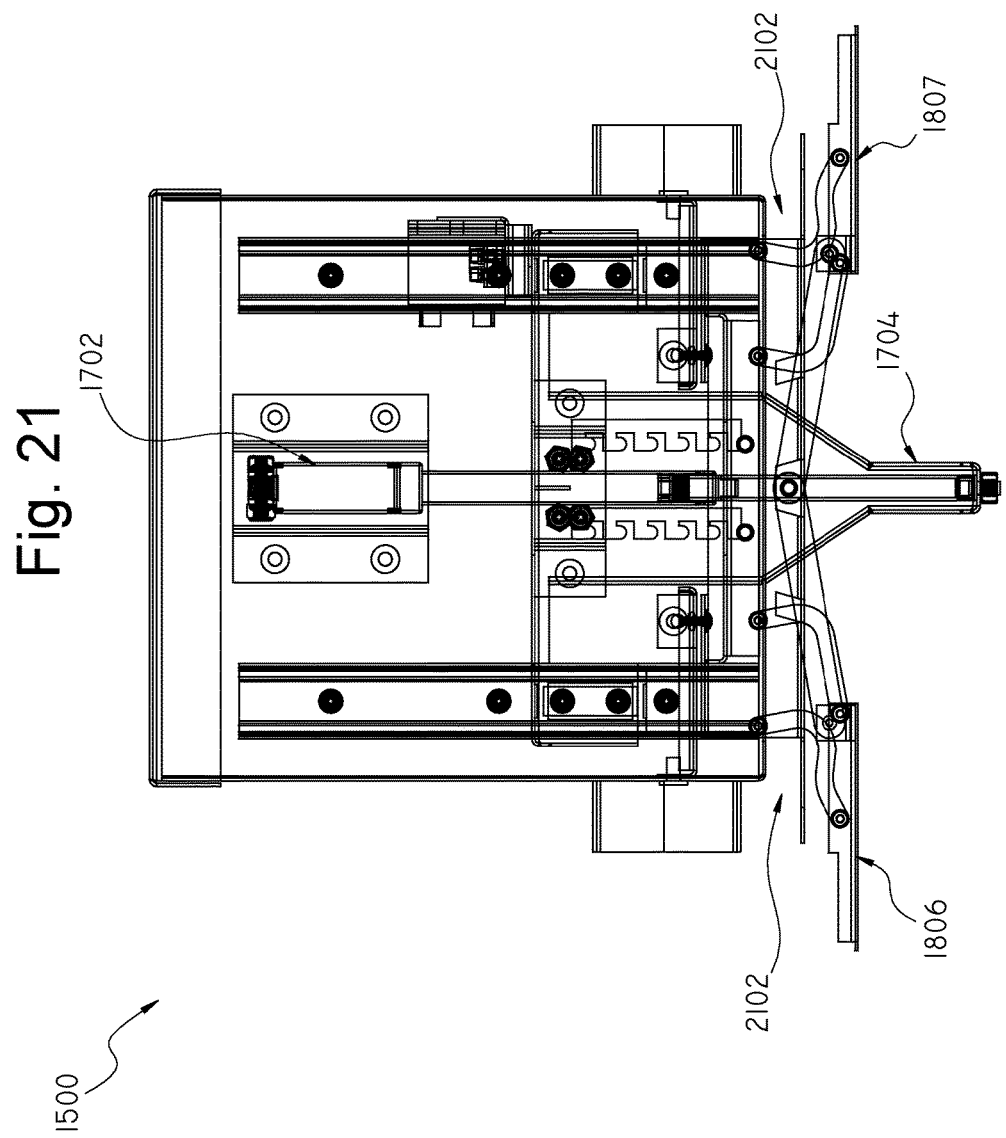

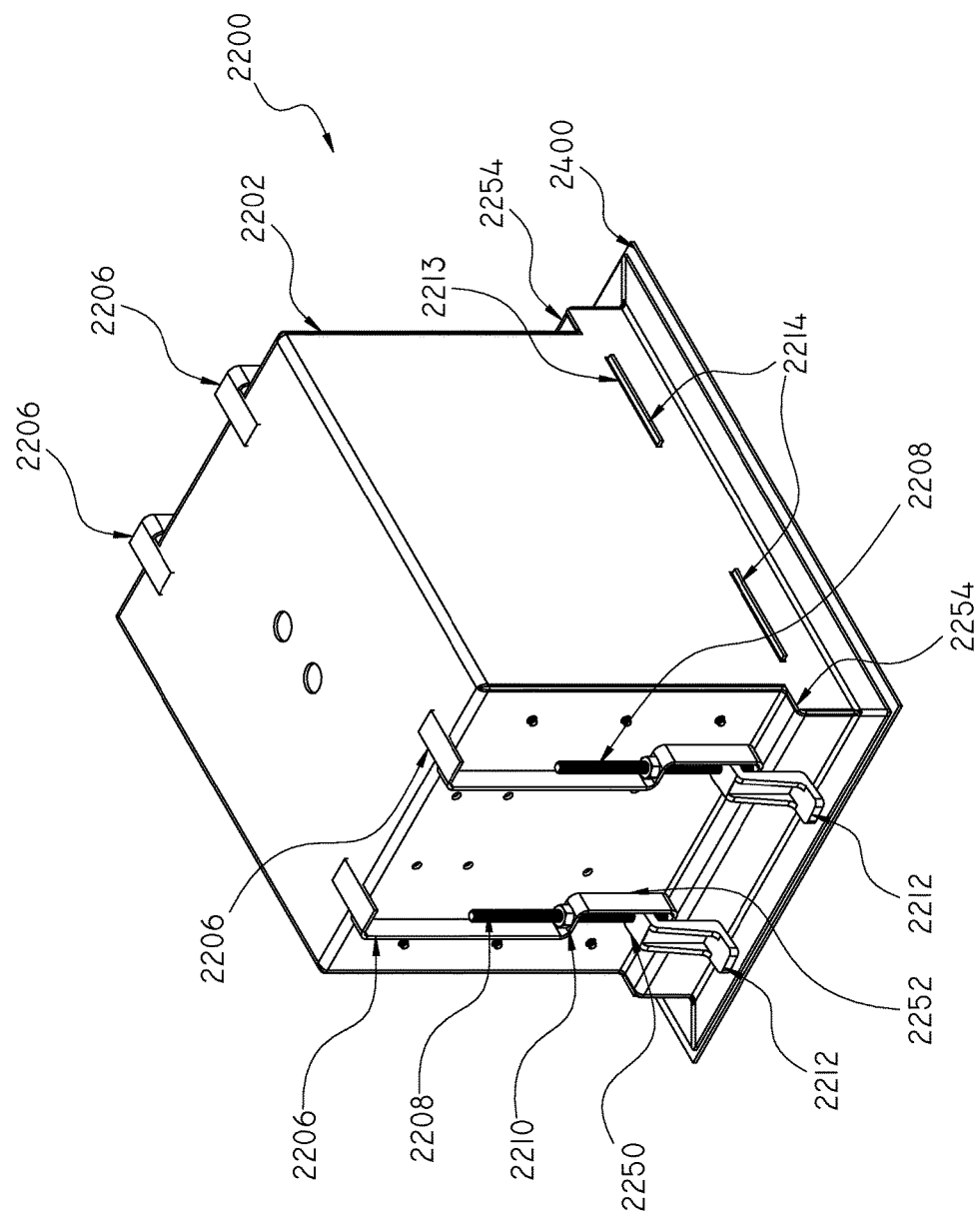

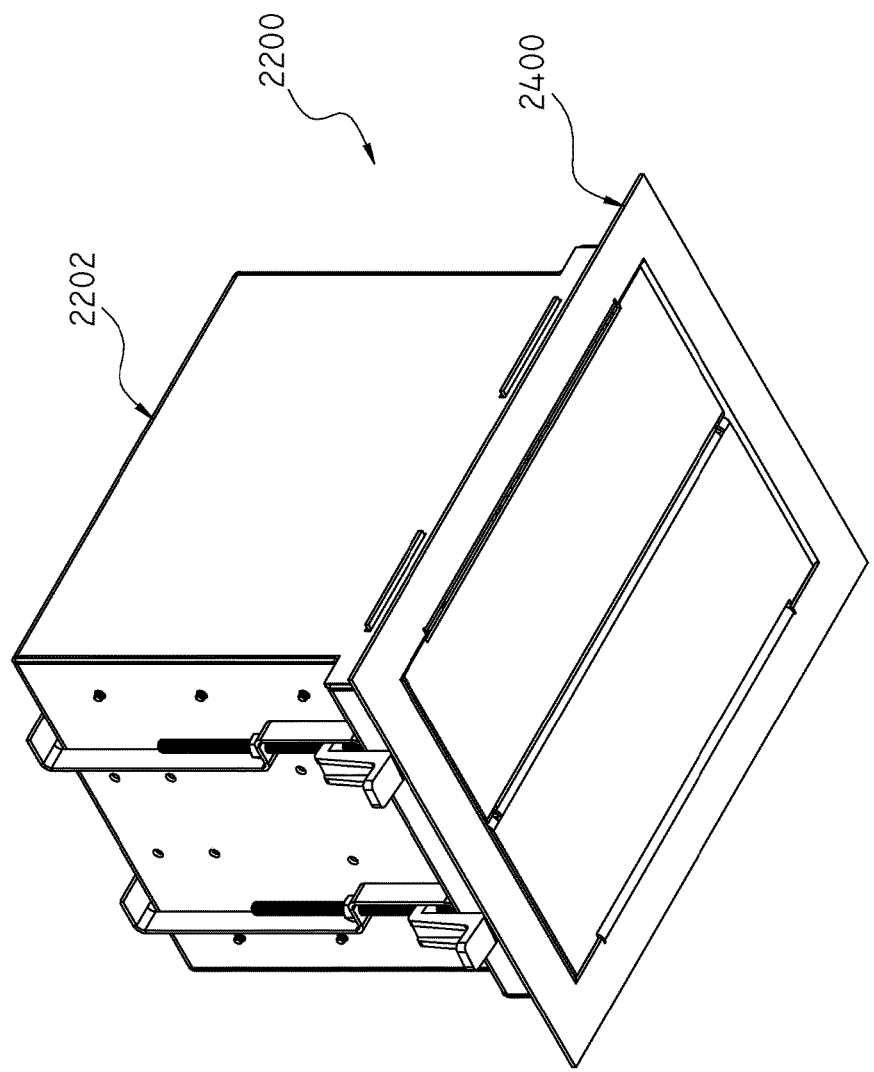

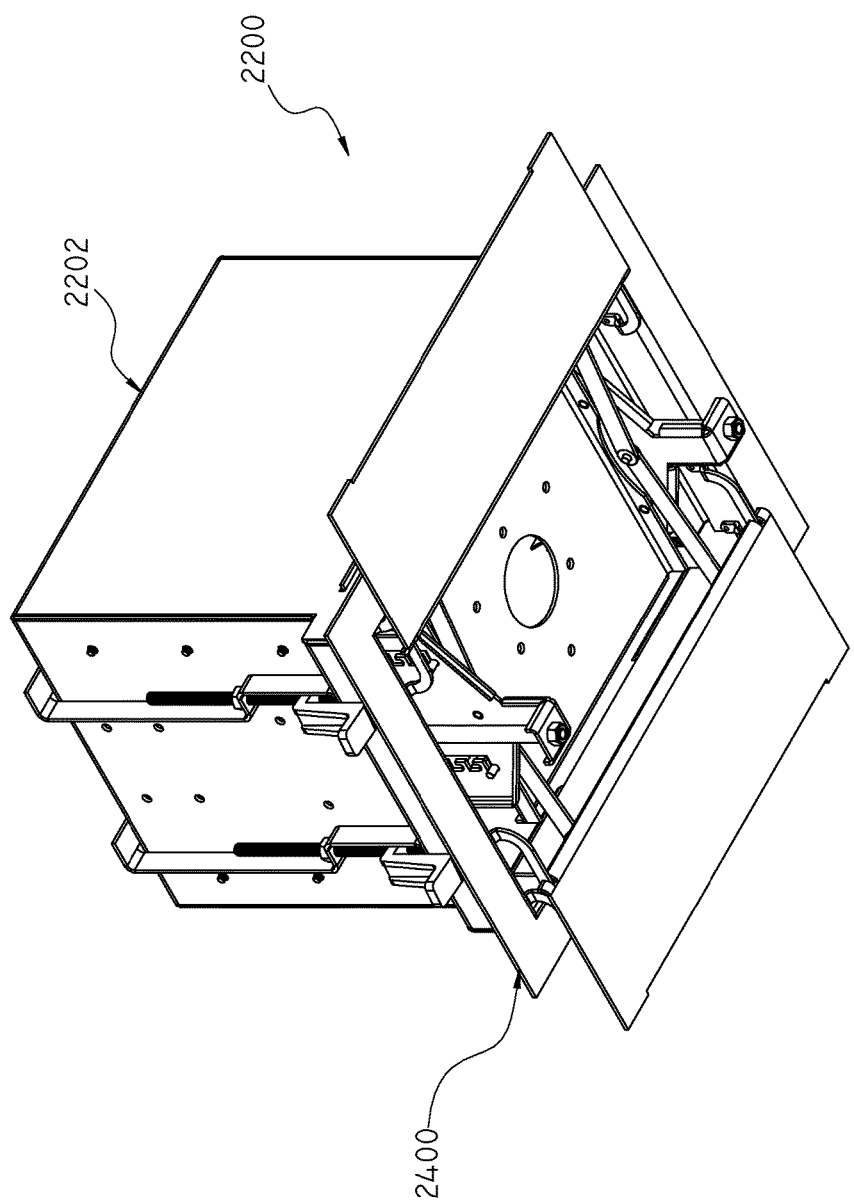

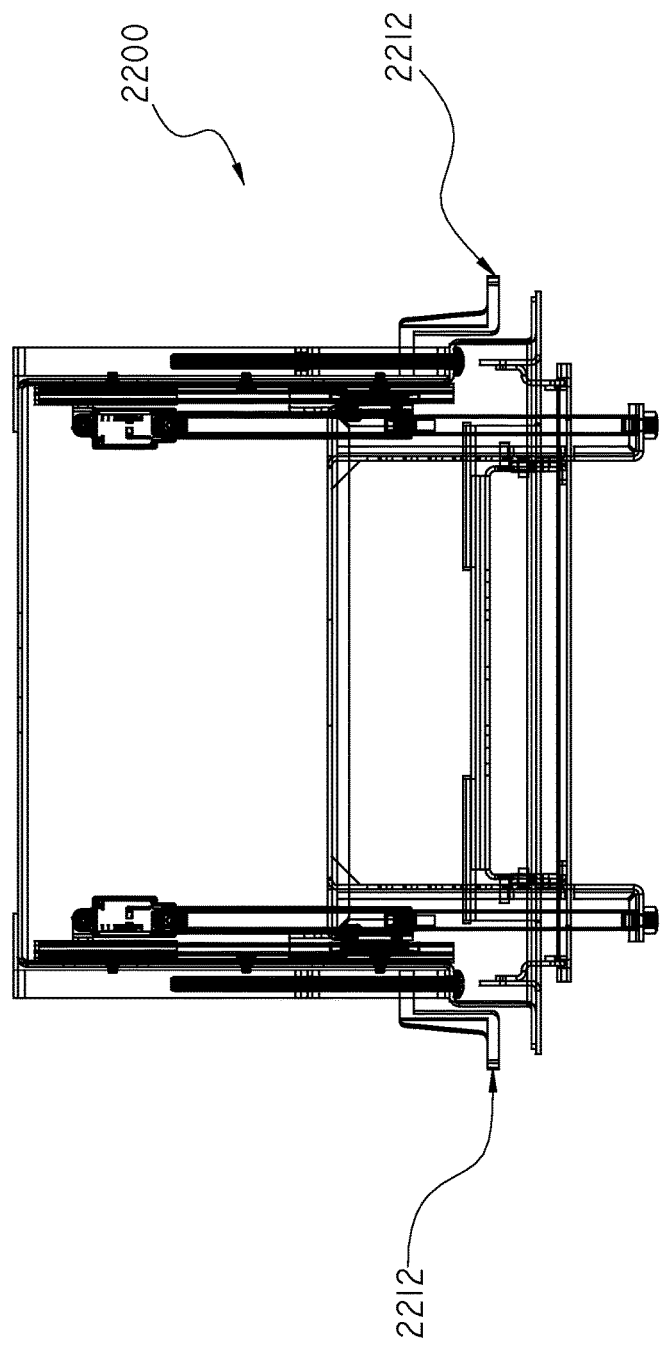

IN-CEILING OR IN-WALL RETRACTING CAMERA PLATFORM SYSTEM

FIELD OF THE INVENTION

The present invention relates to a platform for holding a camera and associated devices from a ceiling or a wall. More particularly, the present invention relates to a camera platform integrated with security systems to control the retracting platform as it raises and lowers from a ceiling location.

DESCRIPTION OF THE RELATED ART

Mounted security cameras are prevalent in commercial and home-based security systems. These cameras allow an individual to view several locations within a building at once from a central location. An operator can monitor a premise without having to leave the central location and can watch several places at the same time.

Not everyone, however, wants full-time surveillance of their property. There may be instances where the camera should or must be turned off. For example, most people do not want a camera recording while in their bedroom. The camera may be desired during those times when the homeowner is not present, and off when the homeowner is in the room. A mounted camera may be turned off by the operator or homeowner, but the homeowner may not be totally sure that the camera is off. Purposeful or accidental recording may occur.

Moreover, the aesthetic quality of the room or premises can be impacted by multiple mounted cameras. The cameras may get in the way or be hit by thrown objects, especially if hanging from a ceiling. Thieves also may turn off or compromise the mounted cameras as the cameras are out in the open.

SUMMARY OF THE INVENTION

An in-ceiling retracting camera platform is disclosed that can be integrated into a residential or commercial setting, and linked with a security system to control retracting the platform. When retracted, the camera platform is hidden with the ceiling or wall. A door assembly or cover may open and close to keep the camera platform hidden and to prevent damage to the camera. Further, the camera will not be able to record or take pictures of someone while retracted, so that a user can have true privacy without sacrificing protection.

Thus, a retracting camera system is disclosed. The retracting camera system includes mounting arms attached to a mounting plate. The mounting plate includes a hole therein. The retracting camera system also includes a frame structure fastened to the mounting plate and supported by the mounting arms. The frame structure is configured in a recess. The retracting camera system also includes an actuator and a linear slide track on the frame structure to move a camera. The retracting camera system also includes a door assembly to cover the hole and to allow the camera to exit the recess. The retracting camera system also includes a means for opening the door assembly.

A system is disclosed. The system includes a retractable camera system enclosed within a recess. The retractable camera system includes a camera. The retractable camera system also includes a frame structure to support the camera. The retractable camera system also includes an actuator to move the camera using the frame structure. The retractable camera system also includes a door assembly to close when the camera is in the recess and to open when the camera is in use. The system also includes a device to send a signal to a transceiver connected to the retractable camera system. The actuator moves the camera in response to the signal.

A retractable camera system enclosed within a recess is disclosed. The retractable camera system includes a camera. The retractable camera system also includes a frame structure to support the camera. The retractable camera system also includes an actuator to move the camera using the frame structure. The retractable camera system also includes a door assembly to close when the camera is in the recess and to open when the camera is in use.

A retractable camera platform system is disclosed. The retractable camera platform system includes an enclosure. The retractable camera platform system also includes two linear actuators attached to the enclosure. The retractable camera platform system also includes a first platform to lower and retract a camera that is movable by the two linear actuators. The retractable camera platform system also includes a plurality of linear slide tracks attached to the enclosure to guide the first platform during movement. The retractable camera platform system also includes a lowering assembly attached to the enclosure. The lowering assembly includes a bezel to mount to the enclosure. The lowering assembly also includes two doors to open and close according to the two linear actuators. The lowering assembly also includes linkages to attach the two doors to the bezel and to guide the two doors.

Another retractable camera system is disclosed. The retractable camera system includes an enclosure. The retractable camera system also includes a main platform and an adjustable platform. The adjustable platform holds a camera and the main platform holds a component to operate the camera. The retractable camera system also includes at least one linear actuator to move the main platform and the adjustable platform. The retractable camera system also includes track means attached to the enclosure to guide the main platform when moved by the at least one linear actuator. The retractable camera system also includes a bezel attached to the enclosure. The retractable camera system also includes at least one door coupled to the bezel by a plurality of linkages.

Another retractable camera system is disclosed. The retractable camera system includes an enclosure. The enclosure includes a mounting assembly. The mounting assembly has a plurality of screw holders to receive screws that insert through holes in the enclosure. The mounting assembly also has a plurality of tightening feet that extend away from the enclosure and configured to receive the screws therethrough. The retractable camera system also includes two linear actuators attached to the enclosure. The retractable camera system also includes a platform to lower and retract a camera that is movable by the two linear actuators. The retractable camera system also includes a plurality of linear slide tracks attached to the enclosure to guide the platform during movement. The retractable camera system also includes a lowering assembly attached to the enclosure using a plurality of tabs inserted into slots within the enclosure. The lowering assembly has a bezel mounted to the enclosure. The lowering assembly also has two doors to open and close according to the two linear actuators. The lowering assembly also has linkages to attach the two doors to the bezel and to guide the two doors.

BRIEF DESCRIPTION OF THE DRAWINGS

Various other features and attendant advantages of the present invention will be more fully appreciated as the same

FIG. 17A illustrates a side view of the retractable camera system with the doors open according to the disclosed embodiments.

FIG. 17B illustrates a side view of the retractable camera system with the doors closed according to the disclosed embodiments.

FIG. 18 illustrates a front-right side perspective view of a lowering assembly for the retractable camera system according to the disclosed embodiments.

FIG. 20A illustrates a bottom perspective view of the retractable camera system in a lowered configuration according to the disclosed embodiments.

FIG. 20B illustrates a bottom perspective view of the retractable camera system in a retracted configuration according to the disclosed embodiments.

FIG. 21 illustrates a front view of the retractable camera system in a lowered configuration according to the disclosed embodiments.

FIG. 22 illustrates a front-right perspective view of another retractable camera system having an enclosure according to the disclosed embodiments.

FIG. 25 illustrates a bottom perspective view of the retractable camera system in a retracted configuration according to the disclosed embodiments.

FIG. 26 illustrates a bottom perspective view of the retractable camera system in a lowered configuration according to the disclosed embodiments.

FIG. 27 illustrates a right side view of the retractable camera system in the lowered configuration according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Figure 1:
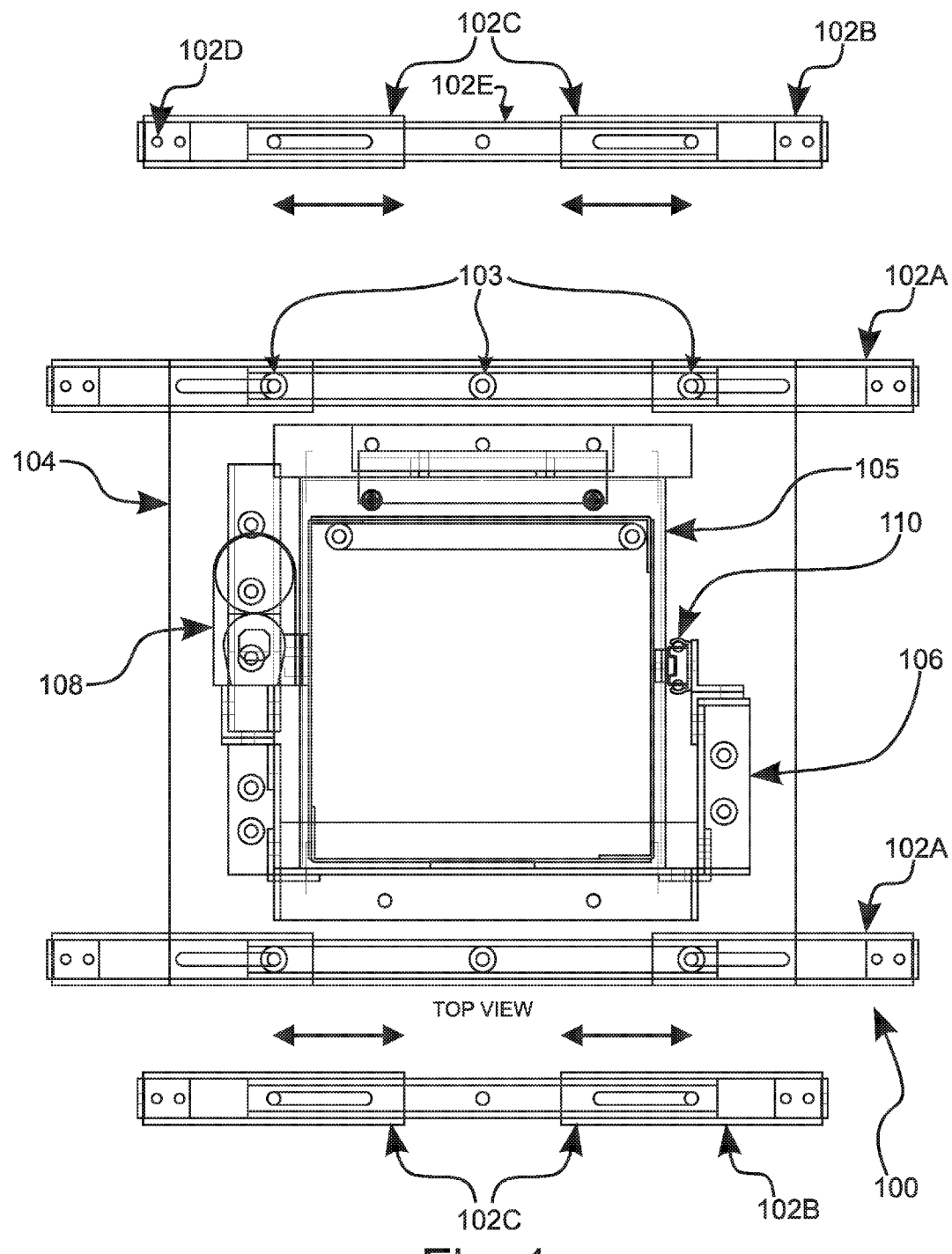
FIG. 1 illustrates a top view of a retractable camera platform system according to the disclosed embodiments.
Figure 2:
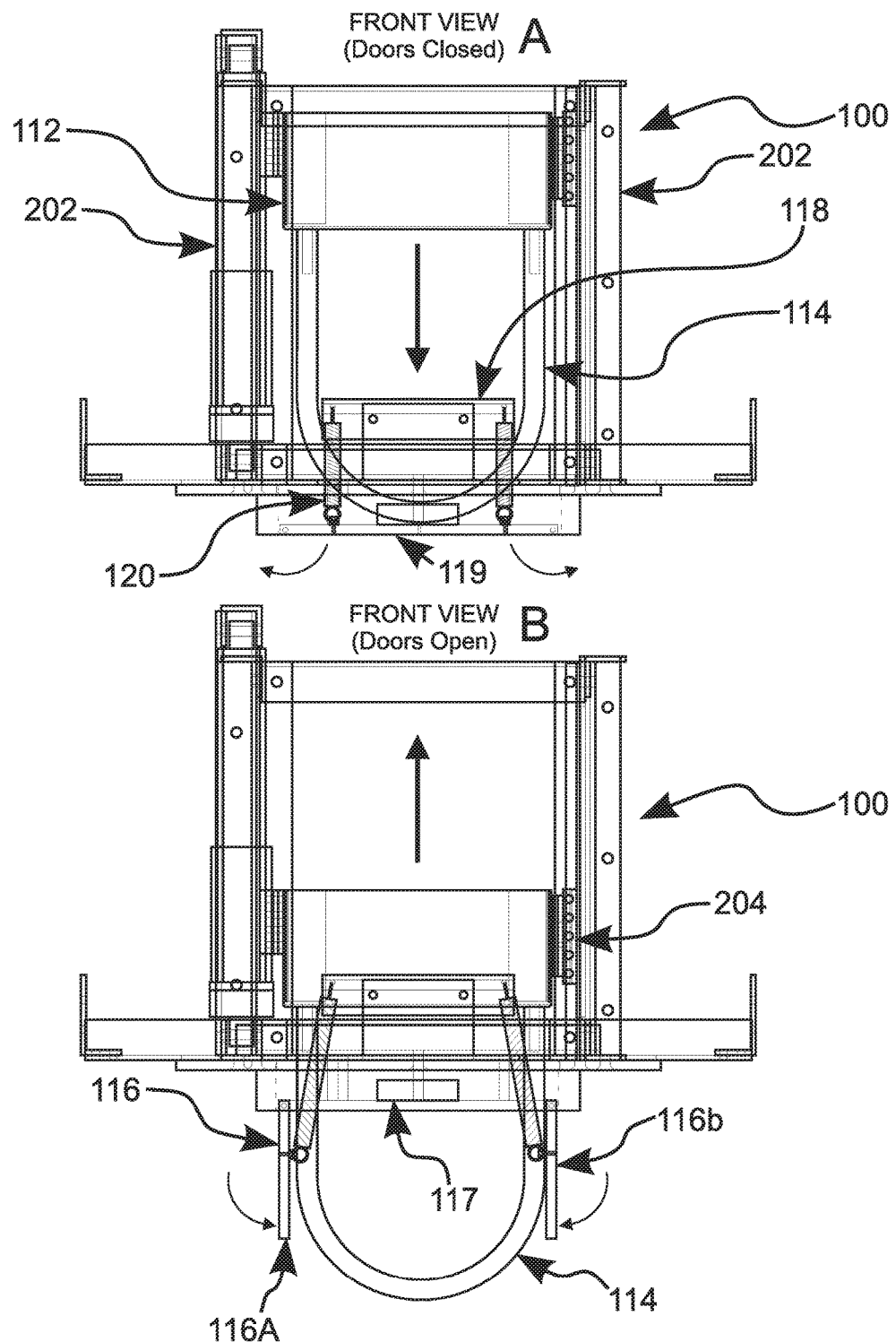
FIG. 2 illustrates front views of the components of the retractable camera platform system according to the disclosed embodiments.

FIG. 1 depicts a top view of a retractable camera platform system 100 and associated components according to the disclosed embodiments. FIGS. 2A-B depict front views of the components of the retractable camera platform system 100 according to the disclosed embodiments. FIG. 2A is a view with the doors closed while retractable camera platform system 102 is retracted while FIG. 2B is a view with system 102 deployed and the doors open. Retractable camera platform system 100 may hold a camera that is linked to a security network to capture and transmit images over the network. Alternatively, the camera may capture and store images at the location of retractable camera platform system 100. The camera may be any small camera system that may fit within platform system 100.

Retracting camera platform system 100 may be integrated into home security systems and wireless/mobile communication systems to control a retracting platform 112 as it raises and lowers from a recess within a ceiling structure.

Alternatively, retracting camera platform system 100 may extend and retract into a recess within a wall. The remaining discussion will focus on the ceiling configuration of system 100 but the same principles may apply to a wall-mounted configuration as well. A variety of small to medium sized camera systems may be mounted and integrated onto the retracting platform 112.

Retractable camera platform system 100 is mounted using adjustable mounting arms 102 for securing to different types of ceiling structures. Adjustable mounting arms 102 allow for the fitting of retracting camera platform system 100 into a variety of places. Once installed, adjustable mounting arms 102 may remain fixed. Adjustable mounting arms 102a depict the arm in an extended configuration, such as when retracting camera platform system 100 is installed in a ceiling or other structure.

Adjustable mounting arms 102b depict the arms in a retracted configuration prior to installation in a ceiling structure. Adjustable mounting arms 102 may be fastened in one of these configurations, or in any increment between configurations when mounted in a ceiling structure. Arm 102 includes extendable arms 102c that extend linearly when mounted. Extendable arms 102c slide along inner portion 102e, as shown in FIG. 1. Fasteners 102d on the ends of extendable arms 102c secure arm 102 to extend across a recess in a ceiling, wall or the like. This configuration provides extra stability for retractable camera platform system 100.

Adjustable mounting arms 102 may be machined from 1 inch by 1 inch by 0.125 inch and 0.75 inch by 0.75 inch by 0.125 inch aluminum channel and 2 inch by 1 inch by 0.125 inch aluminum angle. Adjustable mounting arms 102 may be used to mount between parallel support structures preferably spaced between about 13.21 inches to about 16.5 inches apart. These sizes are preferred in the disclosed embodiments as they fit the scale of retracting camera platform system 100 while having adequate size to support system 100 securely in a ceiling. The two sizes of aluminum channels fit together to create a sliding adjustable mounting arm to fit in most, if not all, ceiling or other structures.

Adjustable mounting arms 102 are fastened and locked into position on a plastic base mounting plate 104, preferably comprised of a delrin plastic sheet having a configuration of 12 in by 12 in by 0.25 in. Connectors 103 are used to do so, and may be screws, pins, and the like to secure arms 102 on plate 104. The remaining parts and components of platform system 100 are mounted to mounting plate 104. Plastic base mounting plate 104 may have a rectangular hole 105 cut into its center for the camera to pass through, and is suspended level with the top surface of the ceiling substrate.

A frame structure 106 is machined from a 1 in by 1 in by 0.125 in aluminum angle and a 1 in by 1 in by 0.125 in aluminum channel. Frame structure 106 is fastened to plastic base mounting plate 104 to support a mini-track actuator 108 and a modified linear slide track 110. Actuator 108 and slide track 110 may be mounted opposite each other on either side of plastic base mounting plate 104. Actuator 108 mechanically raises and lowers camera platform 112. Preferably, actuator 108 is an electric actuator. Camera platform 112 may have a square configuration and made from 0.0625 in thick steel sheet metal. Linear slide track, or linear guide track, 110 mounted on the side opposite actuator 108 prevents camera platform 112 from unnecessary twisting during platform or robotic camera operation.

Camera platform 112 is fastened to an aluminum 0.5 inch diameter round stock bar 114, which is bent into a symmetrical U-shape and internally threaded on both ends. U-shaped stock bar 114 may have other dimensions as well, and lowers and rises with camera platform 112. U-shaped stock bar 114 applies force to open a plastic door assembly 116 fastened to plastic base mounting plate 104.

Frame structure 106 includes supports 202 that support the tracks for actuator 108 and slide track 110. Supports 202 may extend vertically from the mounting plate 104. Supports allow camera platform 112 to move vertically to deploy or retract as desired. Rollers 204 slide along slide track 110. Preferably, supports 202 extend into the recess enclosing retractable camera platform system 100.

Plastic door assembly 116 has a stopper 117 in place to prevent doors 116a and 116b from swinging upwards. An aluminum bracket 118 is fastened near the rear of opening 105 in plastic base mounting plate 104 that connects springs 120 that hold tension onto door assembly 116. Springs 120 also hold doors 116a and 116b closed against a stopper 117 in door assembly 116 at 119 when camera platform 112 is retracted.

When camera platform 112 retracts U-shaped bar 114, it also allows door assembly 116 to close due to the tension in springs 120 that are fastened to the door assembly and bracket. Camera platform 112 can deploy and retract when a signal is relayed to system 100 from an integrated control system. A processor may be connected to a receiver to instruct actuator 108 to raise or lower camera platform 112. This feature is disclosed in greater detail below. The processor may execute instructions stored in an accessible memory to perform these processes.

Figure 3A:
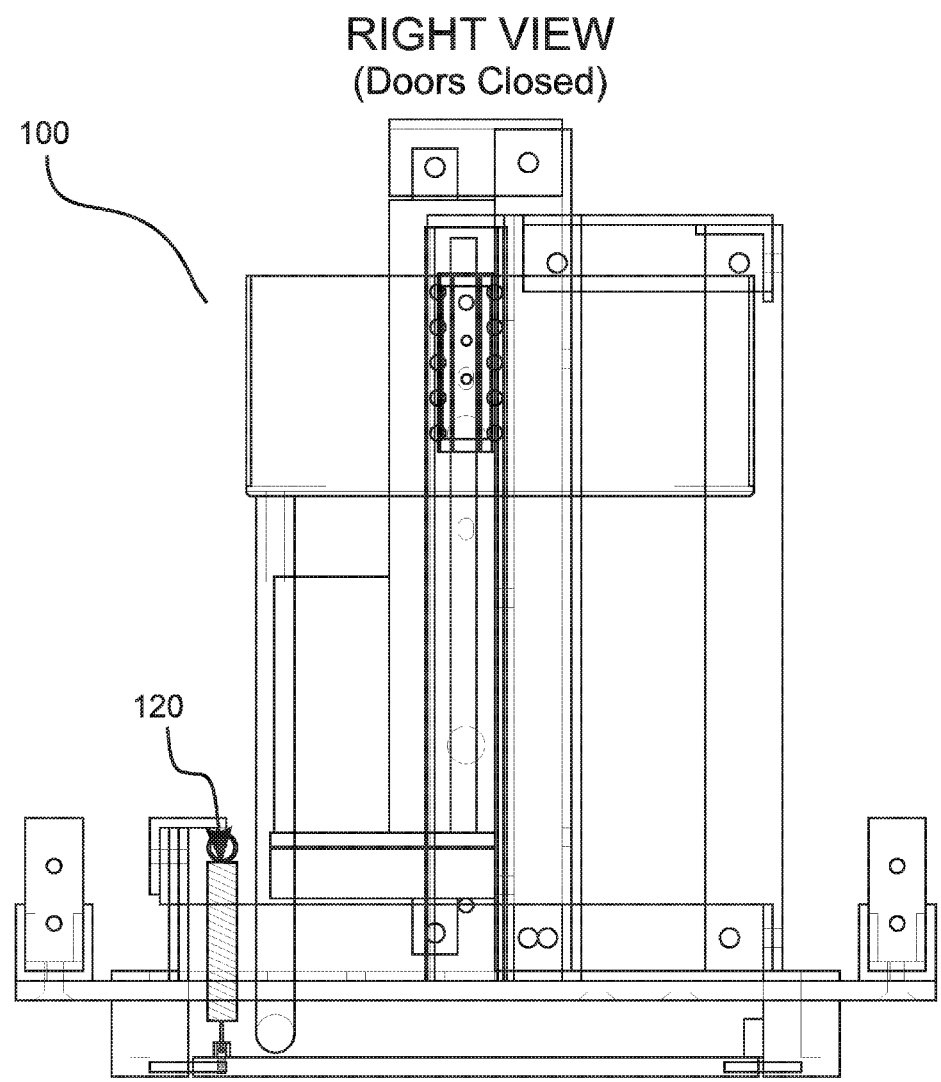
FIGS. 3A-B illustrate side views of the retractable camera platform system according to the disclosed embodiments.
Figure 3B:
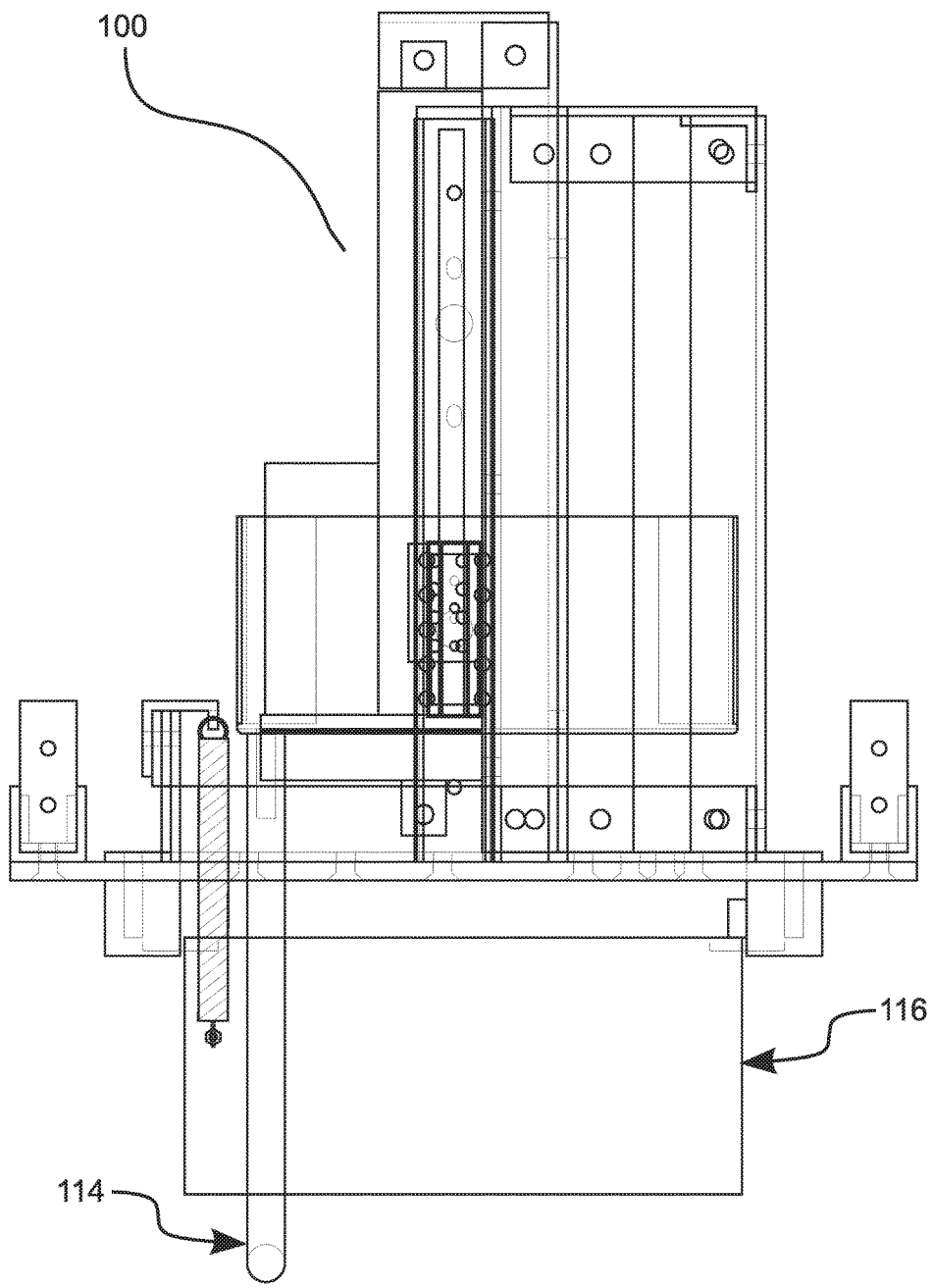

FIGS. 3A-B depict side views of retractable camera platform system 100 according to the disclosed embodiments. FIG. 3A depicts a right side view with door assembly 116 closed and camera platform 112 retracted to hide camera system 100. FIG. 3B depicts a right side view with door assembly 116 open and camera platform 112 lowered to expose the camera. As can be seen, springs 120 extend with door assembly 116 as camera platform 112 is deployed. Bar 114 pushes open door assembly 116. A camera may view the environment and take photos/videos. When bar 114 retracts, springs 120 will move door assembly 116 back to a closed position. When back in the position shown in FIG. 3A, the camera may not take photos/videos, even if instructed to.

Figure 4:
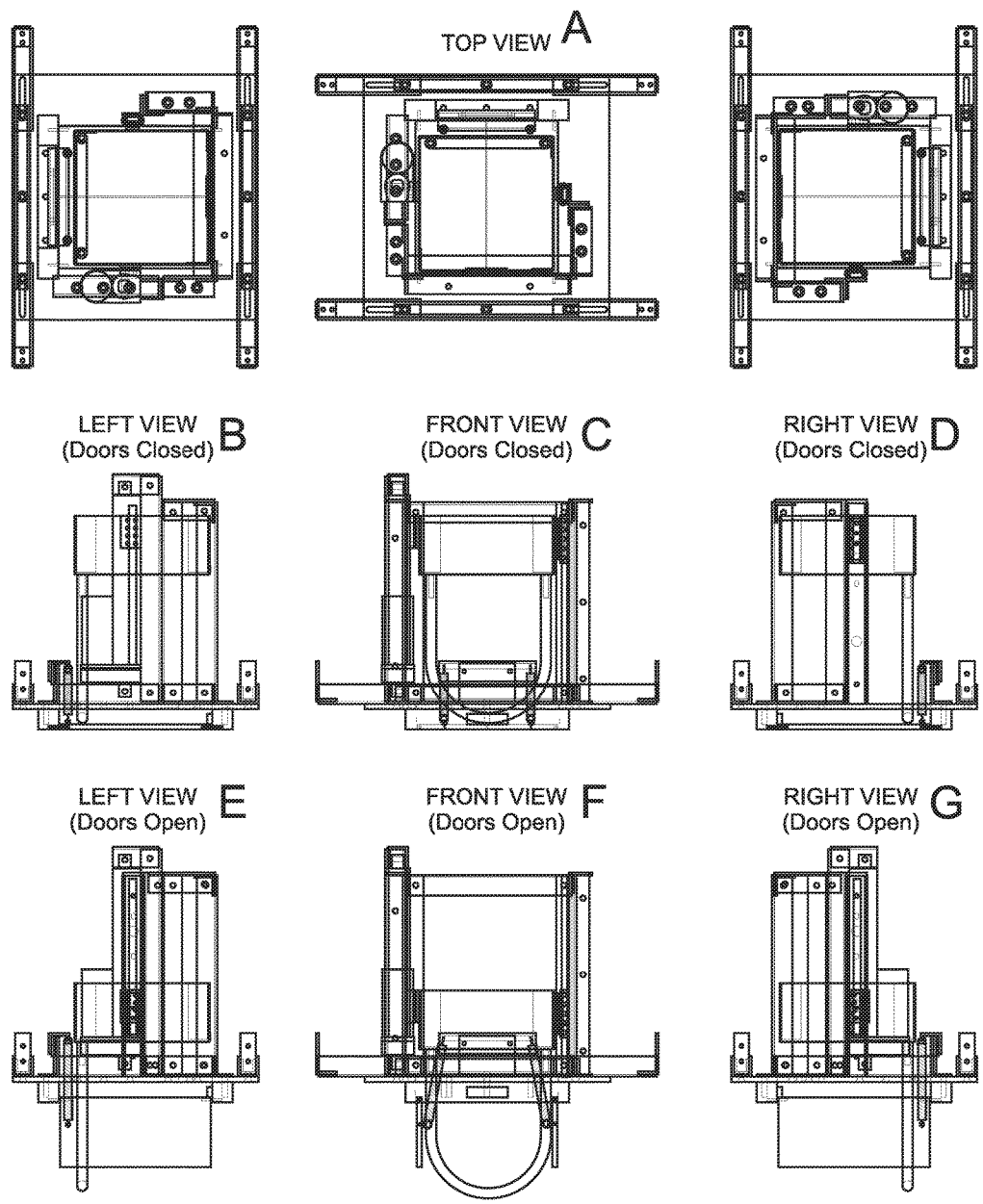
FIG. 4 illustrates views of the retractable camera platform system while open and closed according to the disclosed embodiments.

FIG. 4 depicts views of retractable camera platform system 100 while open and closed according to the disclosed embodiments. FIG. 4A depicts a top view of system 100, similar to FIG. 1. FIGS. 4B, 4C and 4D depict system 100 with camera platform 112 hidden. FIGS. 4E, 4F and 4G depict system 100 with camera platform lowered. Thus, the camera mounted in system 100 may be hidden or in view.

Figure 5:
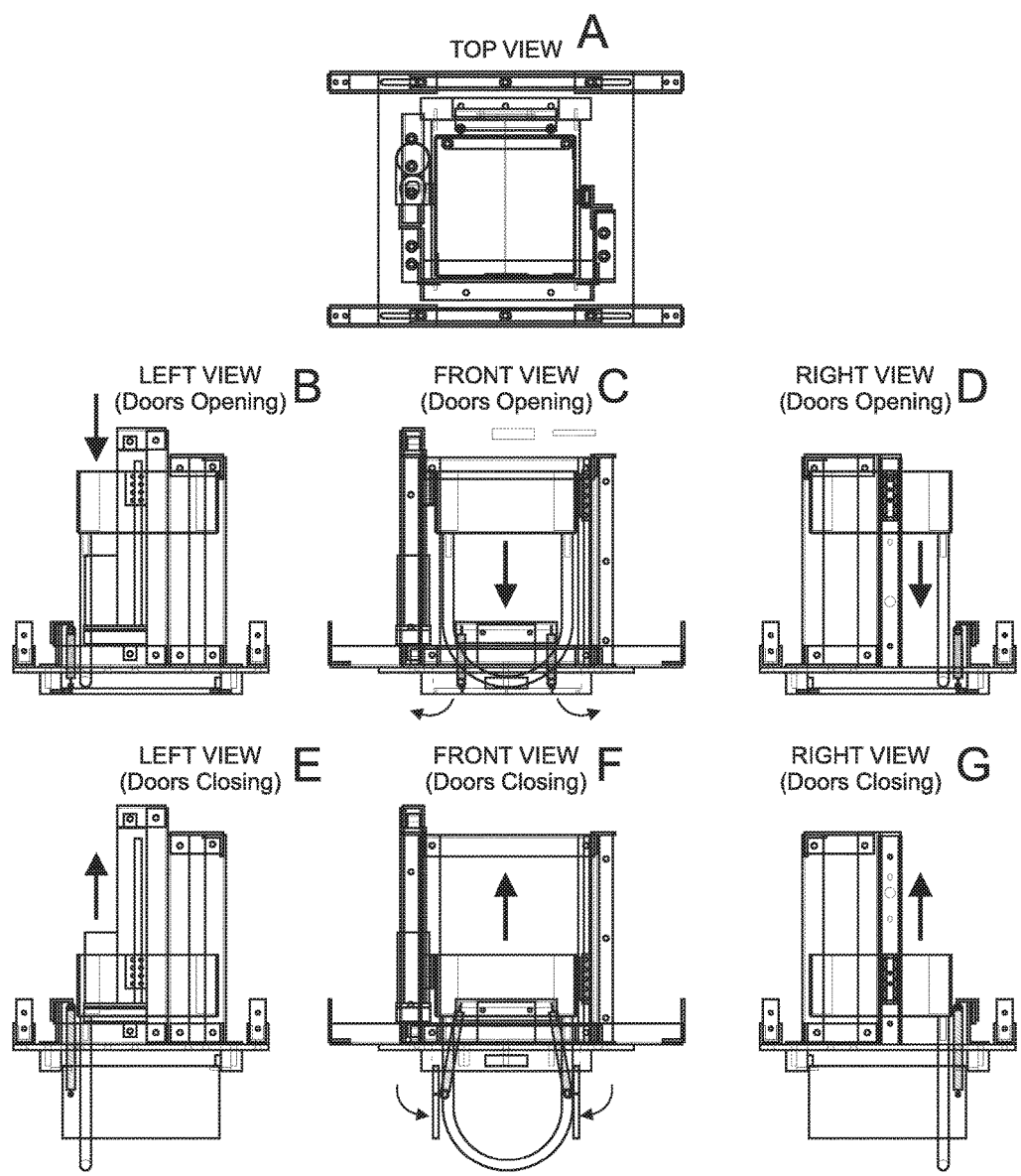
FIG. 5 illustrates views of the retractable camera platform system while opening and closing the doors according to the disclosed embodiments.

FIG. 5 depicts views of retractable camera platform system 100 while opening and closing the doors according to the disclosed embodiments. FIG. 5A depicts a top view of system 100, similar to FIG. 1. FIGS. 5B, 5C and 5D depict system 100 lowering camera platform 112 and opening door assembly 116 by pressing U-shaped bar 114 thereon. FIGS. 5E, 5F and 5G depict system 100 retracting camera platform 112 and closing door assembly 116.

Figure 6:
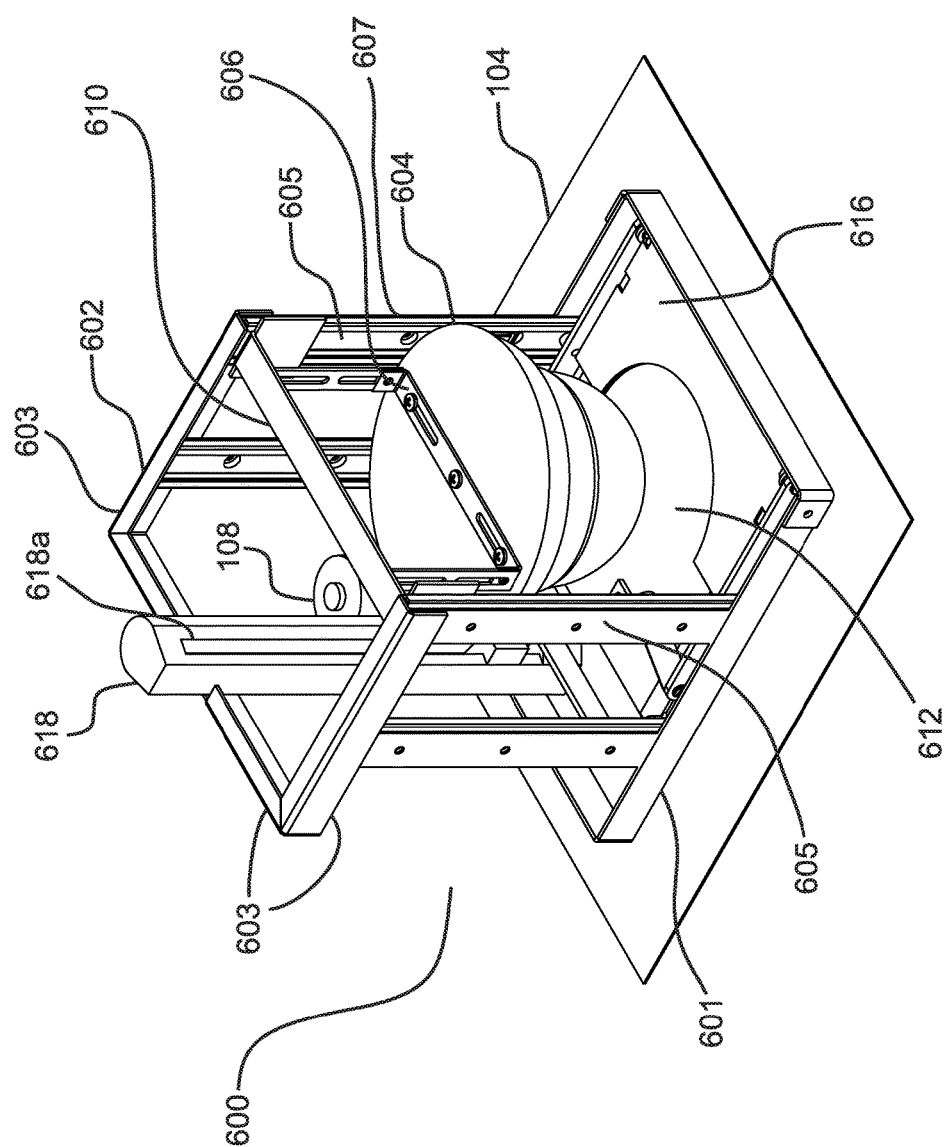
FIG. 6 illustrates a front-right perspective view of another retractable camera platform system according to the disclosed embodiments.
Figure 7:
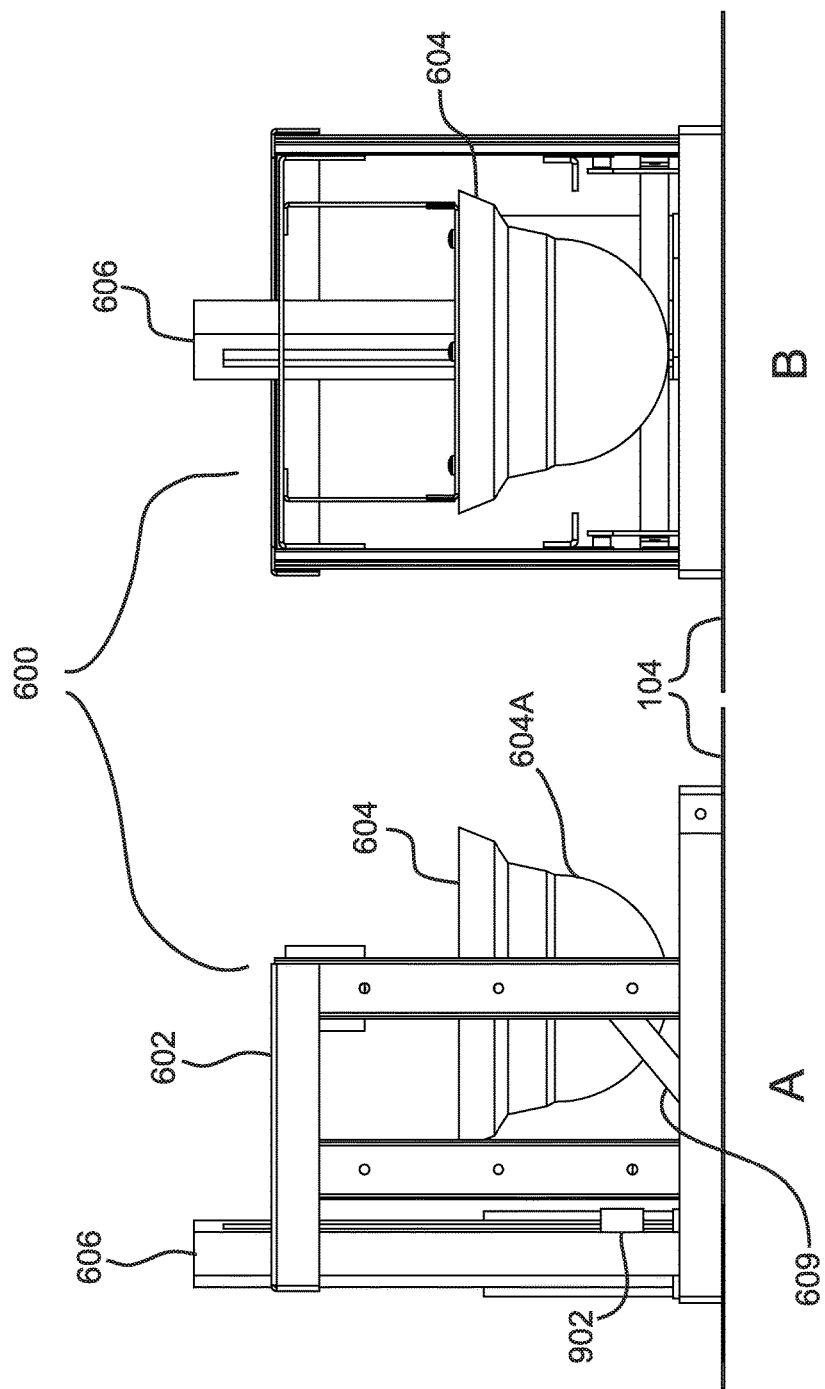
FIG. 7 illustrates views of the retractable camera platform system according to the disclosed embodiments.

FIG. 6 depicts a front-right perspective view of another retractable camera platform system 600 according to the disclosed embodiments. FIG. 7A depicts a side view of retractable camera platform system 600 and FIG. 7B depicts a front view. System 600 is similar to system 100 in that it fits into a recess in a ceiling, wall, enclosure, and the like. The configuration, however, may include several differences, as disclosed below.

Frame structure 602 is connected to base mounting plate 104 using tracks 601. Tracks 601 are connected to and support supports 607, which extend away from mounting plate 104. Supports 607 help move camera 604 within a plane orthogonal to mounting plate 104. Preferably, frame structure 602 includes four supports 607, with two of the supports housing tracks 605. Camera 604 may move along tracks 605. Thus, if system 600 is enclosed within a ceiling, then it moves camera 604 vertically to deploy or retract.

Linear actuator 108 moves camera 604. Linear actuator 108 may move connector 902 in a groove 618a of support 618. It does so differently than system 100, and is disclosed in greater detail below. Upper supports 603 provide additional support for camera 604 and encase system 600. Upper bar 610 is connected to camera 604 with connector bars 606. As shown, connector bars 606 include a U-shaped configuration with one bar directly attached to camera 604.

Door assembly 616 includes partitions and a cover 612. Cover 612 prevents camera 604 from being seen when it is retracted. Cover 612 moves using movable bars 609, disclosed below. Cover 612 is connected to movable connector 902 that moves within groove 618a. Movable connector 902 moves in response to actuator 108. Thus, as shown in FIG. 9, when cover 612 is drawn up support 618, then camera 604 is able to deploy through the aperture created by door assembly 616.

Figure 8:
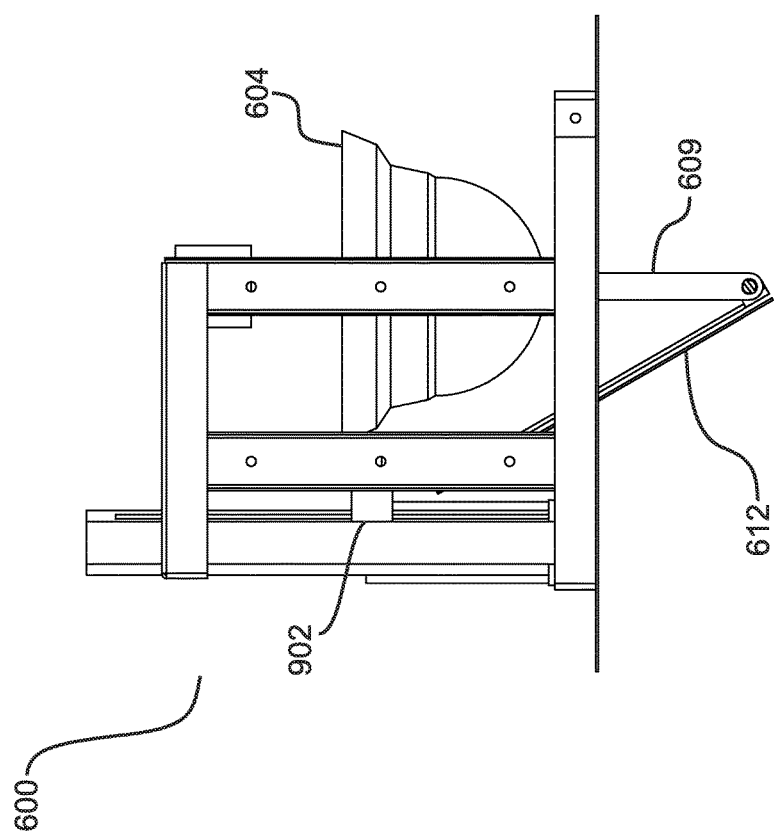
FIG. 8 illustrates a side view of the retractable camera platform system while opening or closing according to the disclosed embodiments.

Camera 604 moves along tracks 605 using upper bar 610. FIG. 8 depicts retractable camera platform system 600 while it is moving or being deployed according to the disclosed embodiments. As shown, movable bars 609 extend outwardly from mounting plate 104 to rotate into a new position. Cover 612 is connected to linear actuator 108 via connector 902. As the connector moves upward, it pulls cover 612 up with it. Cover 612 is on pivots with movable bar 609, which is connected to linear carriages in rails of tracks 601.

Camera 604 is deployed through the opening left from the movement of cover 612. Door assembly 616 surrounds camera 604, as shown in FIG. 9. FIG. 9 depicts system 600 in a deployed state. FIGS. 10A and 10B also show different views of deployed system 600. Movable bars 609 are in a different position than in the retracted state. A partition of door assembly 616 may be moved forward as cover 612 is moved upwards with actuator 108.

Figure 9:
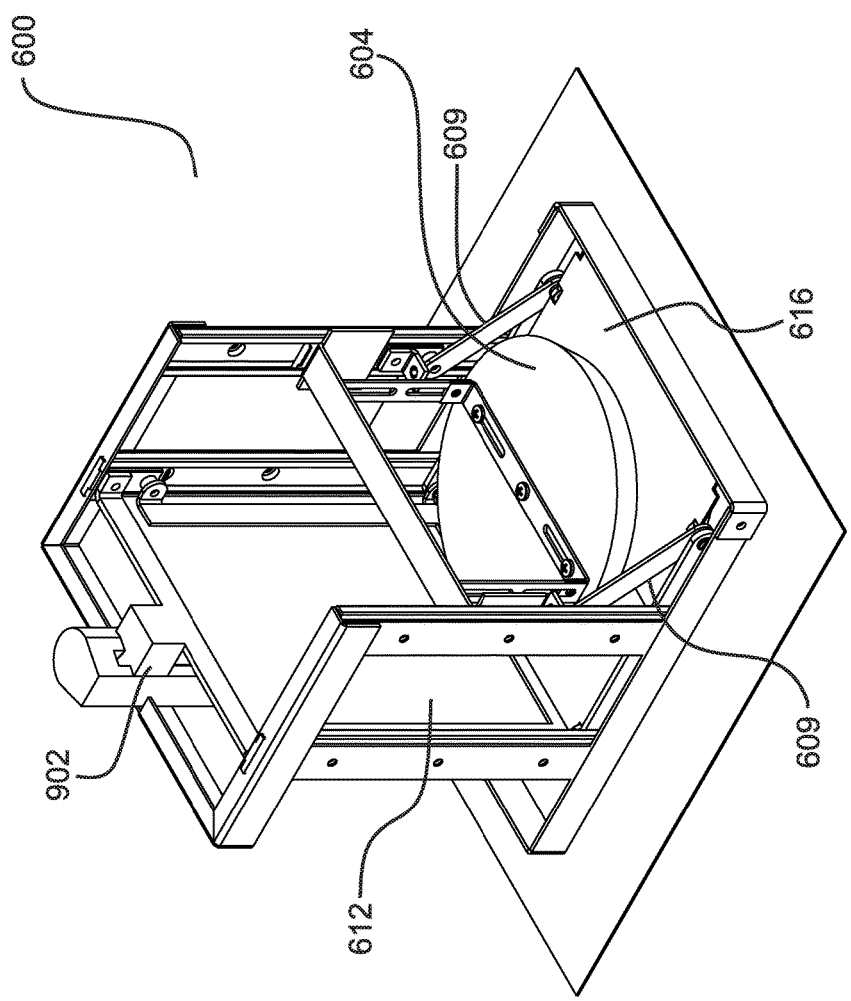
FIG. 9 illustrates a front-right perspective view of the deployed retractable camera platform system according to the disclosed embodiments.
Figure 10:
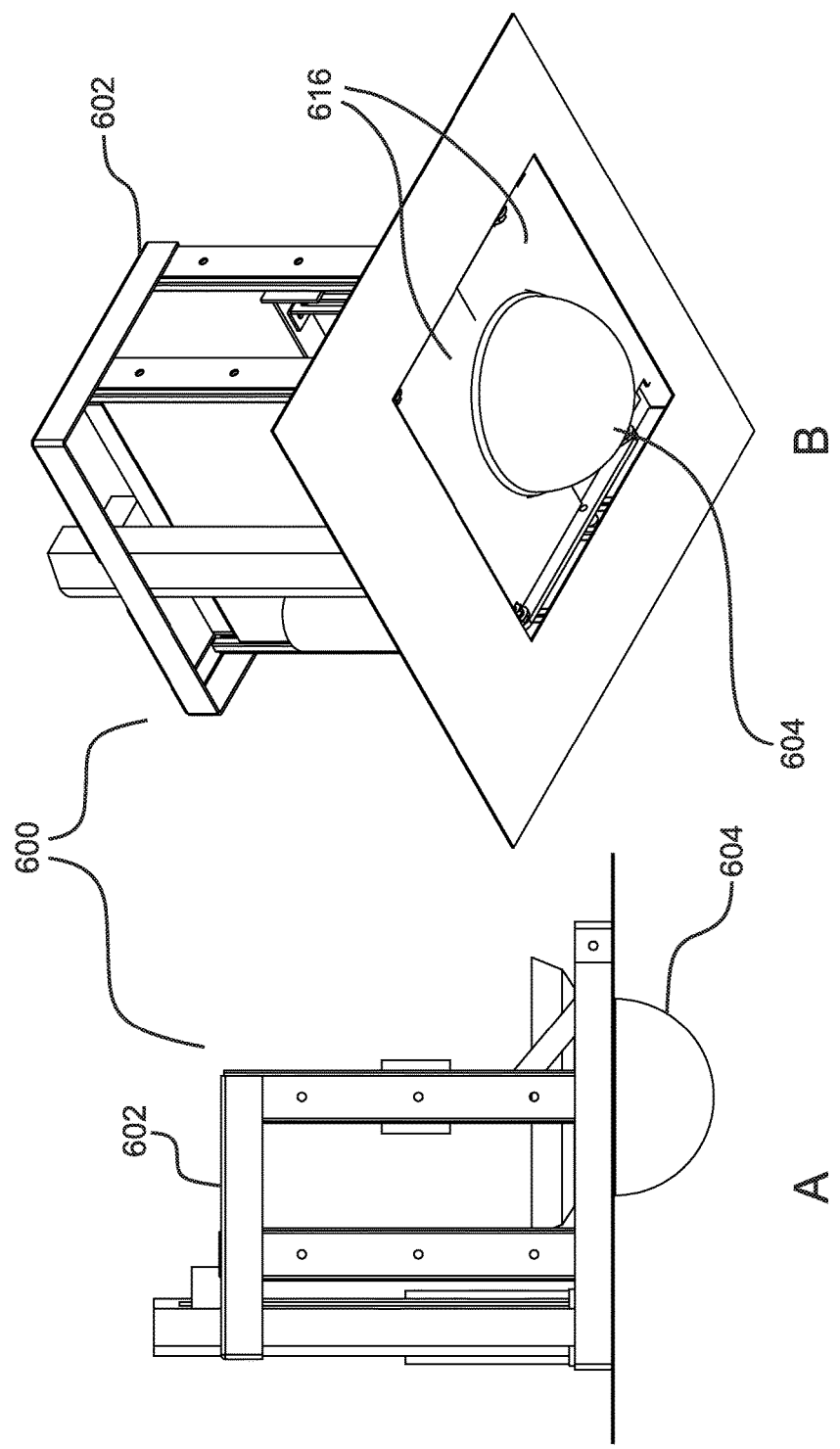
FIG. 10 illustrates side views of the deployed retractable camera platform system according to the disclosed embodiments.

As can be seen in FIGS. 9, 10A and 10B, camera 604 is visible outside the recess enclosing system 600. Thus, camera may be subtle. Unlike system 100, system 600 provides an element of stealth by not apparently being a camera brought out to monitor or take pictures. Camera 604, due to the configuration of system 600, may be a rotatable camera to provide a full 360 degree viewing area, as well as rotating on an X axis and Y axis. Camera 604 includes a dome 604a. No platforms or doors may obstruct the view of camera 600 in this configuration.

Figure 11:
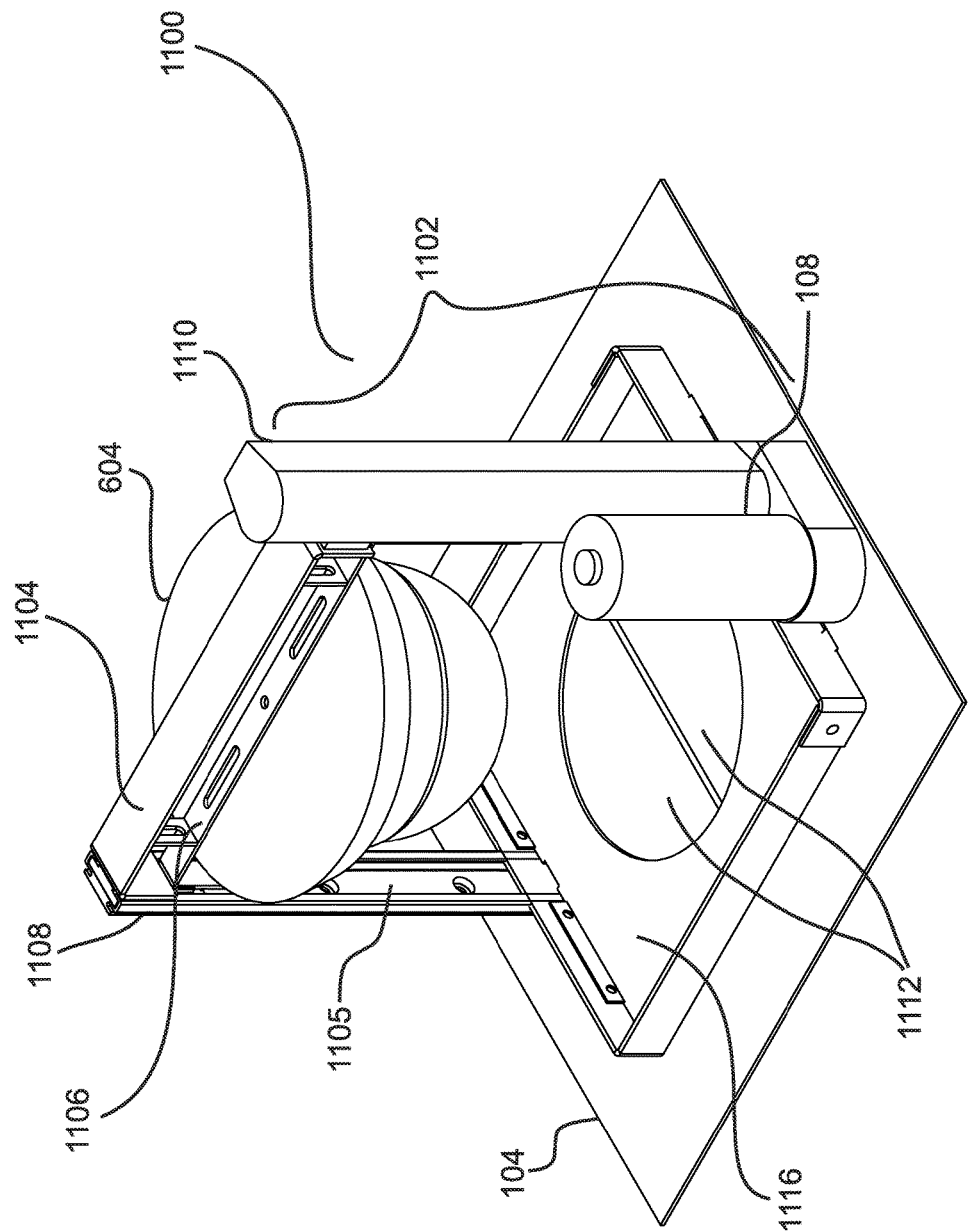
FIG. 11 illustrates a front-left perspective view of another retractable camera platform system according to the disclosed embodiments.

FIG. 11 depicts a front-left perspective view of another retractable camera platform system 1100 according to the disclosed embodiments. Camera 604 again is a full view camera providing views from different angles and positions. As with system 600, system 1100 is supported by mounting plate 104. Frame structure 1102 supports camera 604 and moves it to retract or deploy for use.

Frame structure 1102 includes supports 1108 and 1110. Support 1108 encloses track 1105. Support 1110 operates with actuator 108 to move camera 604. A groove within support 1110 may provide the track to allow a connector, like connector 902, to move. Upper bar 1104 and connecting bar 1106 attach to camera 604 and move within track 1105 and the groove in support 1110.

Cover 1116 may be located in the rectangular aperture within mounting plate 104. Doors 1112 may be located underneath cover 1116, and open to allow camera 604 to deploy outside frame structure 1102.

Figure 12:
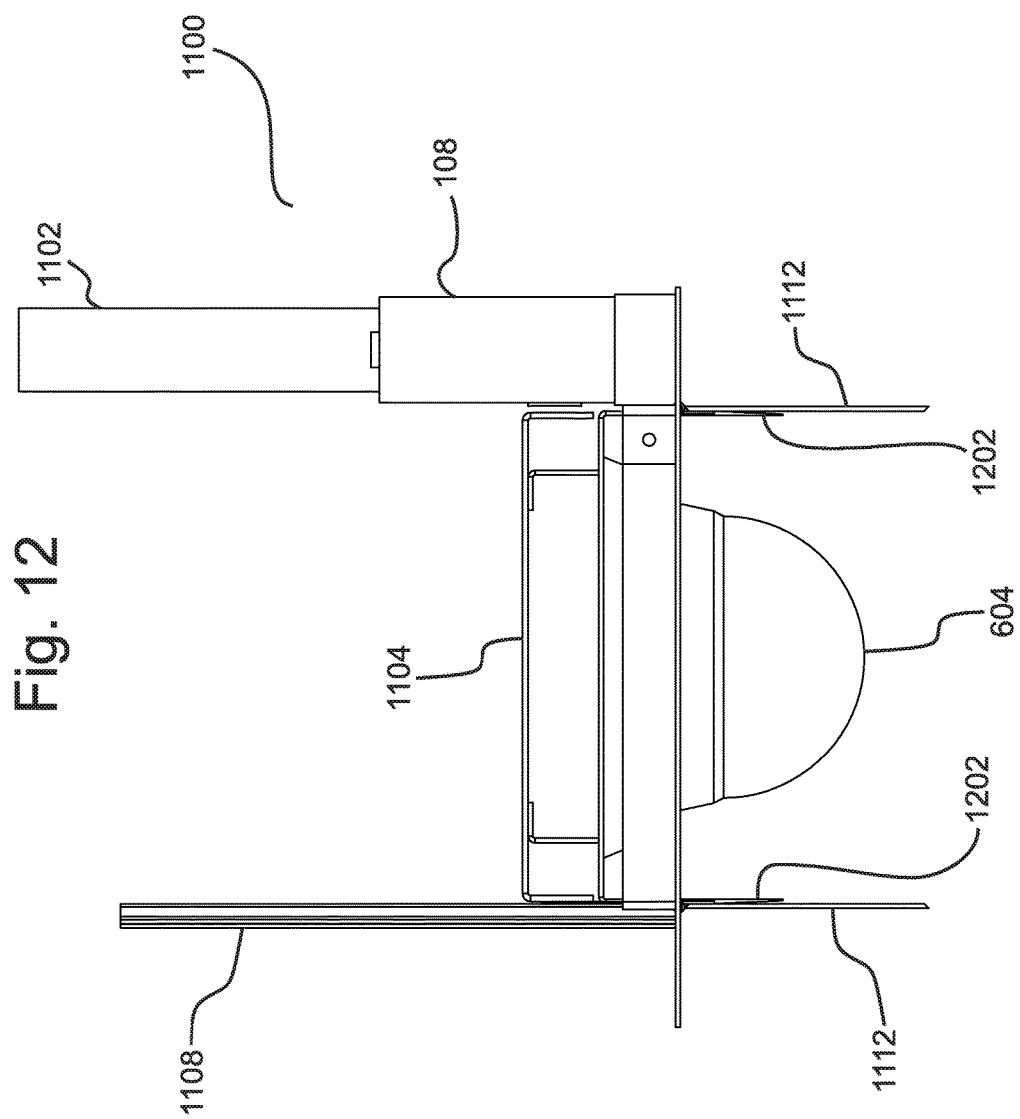
FIG. 12 illustrates a side view of the deployed retractable camera platform system according to the disclosed embodiments.
Figure 13:
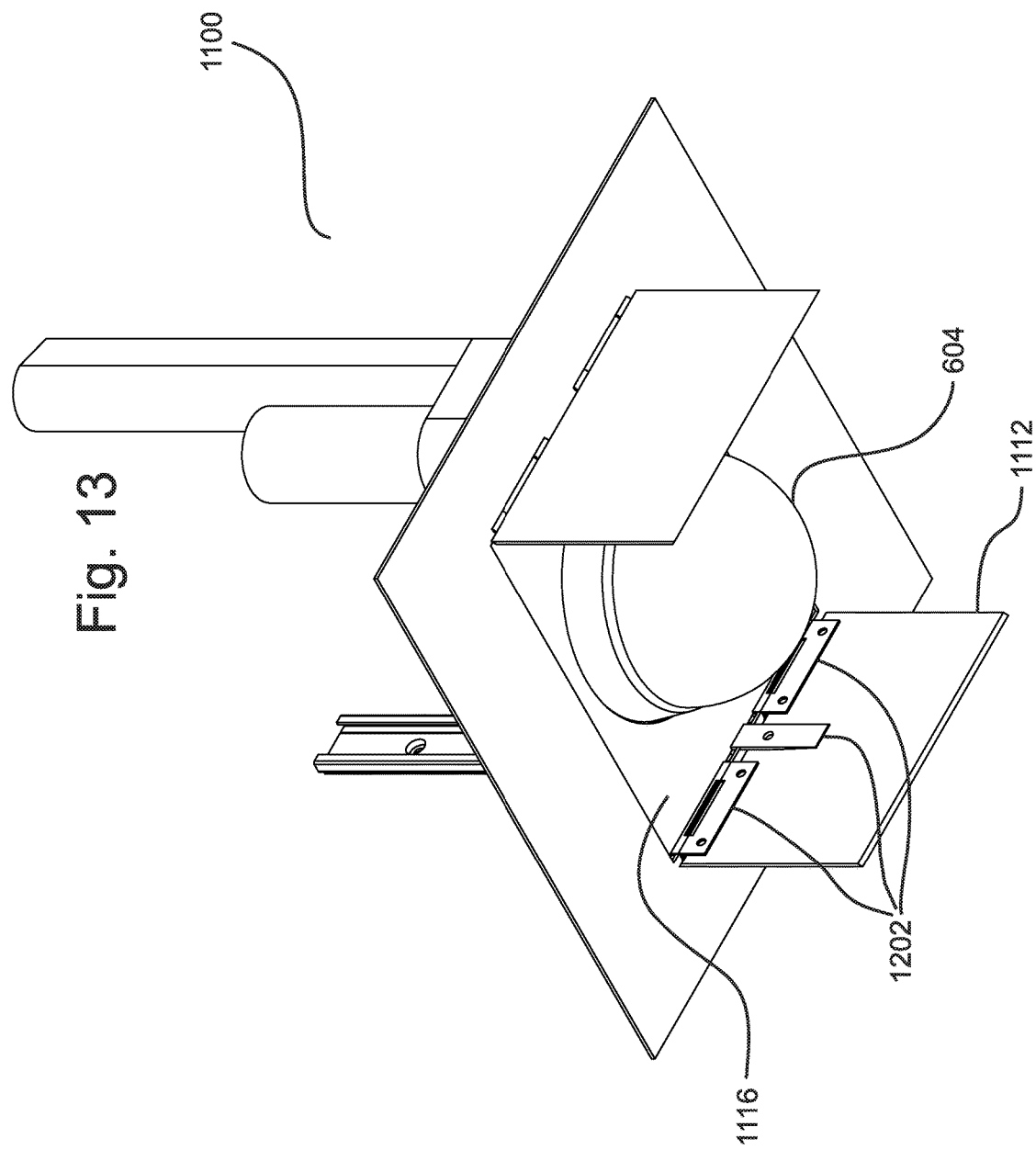
FIG. 13 illustrates a bottom-left perspective view of the deployed retractable camera platform system according to the disclosed embodiments.

FIG. 12 depicts a front view of retractable camera platform system while deployed, or in use, 1100 according to the disclosed embodiments. FIG. 13 depicts a bottom-left perspective view of retractable camera platform system 1100 while deployed according to the disclosed embodiments. Camera 604 moves in conjunction with actuator 108 to open doors 1112. Hinges 1202 are attached to doors 1112 to open them. Hinges 1202 include torsion springs that keep doors 1112 normally closed. As camera 604 is lowered, the dome of the camera and tabs on either side forces open doors 1112.

Camera system 1100 may provide a simpler structure than camera system 600. System 1100 may be applicable for spaces or recesses not quite as large as other systems. System 1100 also may be more applicable for ceiling configurations to lower and retract camera 604.

Figure 14:
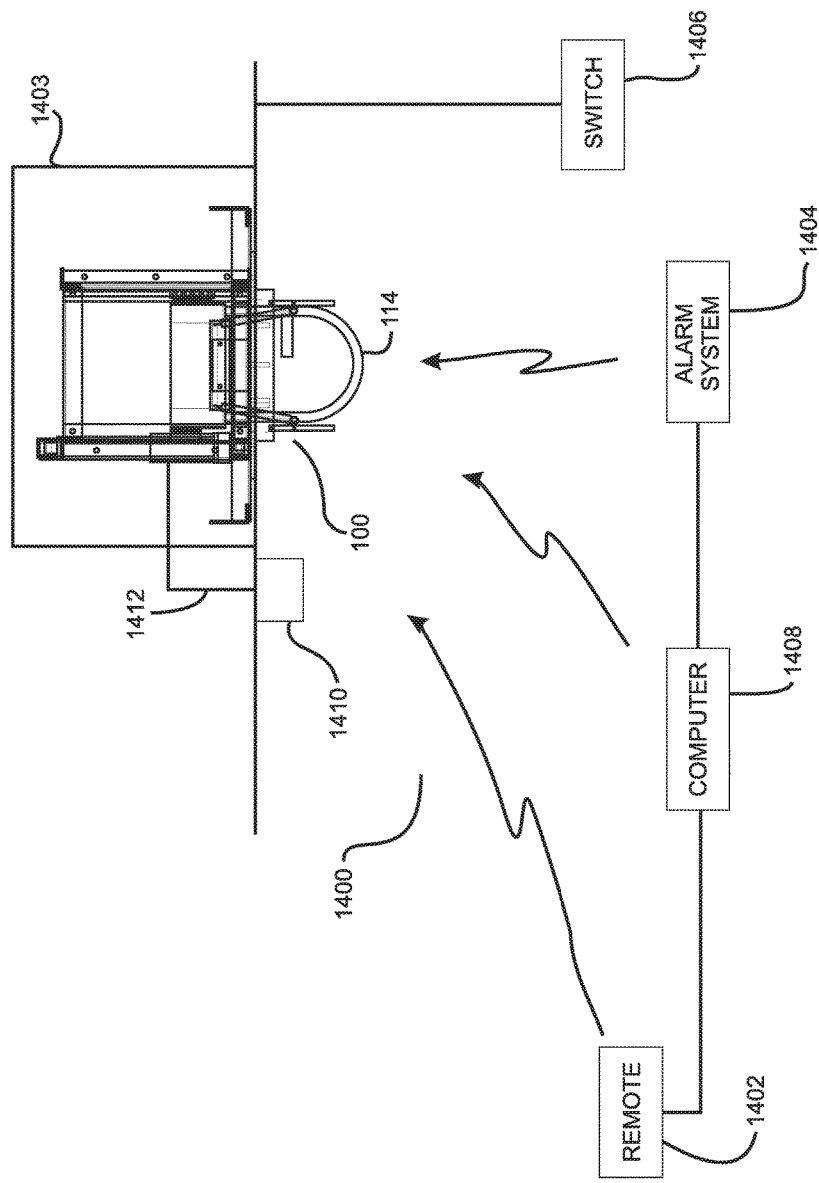
FIG. 14 illustrates a block diagram of a system using the retractable camera platform system according to the disclosed embodiments.

FIG. 14 depicts a block diagram of a system 1400 using the retractable camera platform system according to the disclosed embodiments. Although the retractable camera platform system is designated as 100, the other systems (600 and 1100) and their equivalent embodiments also may be incorporated into system 1400.

System 1400 shows how the camera systems disclosed above interact with other components. The disclosed embodiments are not limited to the components disclosed in FIG. 14, and additional components may be used to deploy and retract a camera as needed. System 1400 may be a wireless network. Alternatively, system 1400 may include wired and wireless components that communicate with camera system 100.

Preferably, system 1400 includes retractable camera platform system 100 enclosed within a recess 1403. Recess 1403 may be located within a ceiling, wall, and the like. Alternatively, recess 1403 may be located outside of a building, in the ground, or anyplace that recess 1403 may be built. Also preferably, recess 1403 encloses the frame structure of the applicable camera system installed. Although shown as a block shape, recess 1403 may be any shape desired or required.

Camera system 100 deploys and retracts to allow a camera to view the area of interest. In the embodiment shown, U-shaped bar 114 opens door assembly 116 to allow platform 112 to lower. Camera system 100 is instructed to do so by a variety of processes. Examples of these processes are disclosed below.

Switch 1406 may be coupled to camera system 100 so that a user turns the switch "on" to deploy the camera for operations. Switch 1406 may configured to directly connect with actuator 108 to operate camera system 100. When switch 1406 is turned into an "off" state, then the camera is retracted back into recess 1403. This configuration allows the camera system to be used and taking pictures/video when requested. The user determines the level of privacy desired. Switch 1406 may include a timer control so that the camera is retracted after a specified period of time, in case the user forgets to turn off the switch. Switch 1406 may be a push button switch, single pole switch, and the like. Multiple camera systems may be coupled to switch 1406, and a plurality of switches may control a single camera system. Switch 1406 also may be variable, so that the camera is lowered, or deployed, for certain distance from recess 1403. Alternatively, switch 1406 may be wirelessly connected to camera system 100 through system 1400.

Camera system 100 also may react to signals or instructions received from devices connected wirelessly or wired to system 1400. Examples of such devices are shown in FIG. 14. A wireless transceiver 1410 may receive a signal from remote 1402, computer 1408 or alarm system 1404 to deploy or retract, and use, camera system 100. Transceiver 1410 may exchange information with these devices over a wireless network. The network may be a local area network, such as in a home, or a large network, such as those supported by wireless data companies. Transceiver 1410 also may send information to devices connected to the network to provide status or updates to a user. Connection 1412 may receive a signal from transceiver 1410 to activate actuator 108. Transceiver 1410 is shown separate from camera system 100, but it may be incorporated into system 100. Further, transceiver 1410 may be located within its own recess so that it is not readily visible to an observer.

Remote 1402 may be a handheld device used by one to deploy or retract camera system 100. Remote 1402 may be carried by the user. Remote 1402 also may be a smartphone, or other device running an application that allows the device to communicate within system 1400. Remote 1402 may issue different commands to camera system 100 beyond just deploy and retract. The user may indicate a period of time that camera system 100 is deployed. Remote 1402 also may include a sensor that detects conditions to deploy camera system 100.

Computer 1408 also may communicate with camera system 100 via system 1400. Computer 1408 may differ from remote 1402 in that it provides more robust functionality and control. Computer 1408 includes a processor, memory for storing instructions used by the computer to provide functions, input/output ports, and the like. Computer 1408 may store images or video generate by camera system 100 for future reference or backup. The user may open a window or program to set up the sending of commands to computer system 100 according to specified criteria or conditions.

For example, an application running on computer may provide a graphical user interface to set times for camera system 100 to deploy and be in use, such as evening hours for a business. The application also may include conditions that trigger camera system 100 to act, such as when computer 1408 is turned off. A user may have camera system 100 deploy when the computer shuts down, and it is assumed that no one is in the immediate area. Computer 1408 also may be wired to alarm system 100, much like switch 1406.

Alarm system 1404 provides additional functionality to system 1400. When an emergency condition is detected, alarm system 1404 sends a signal for camera system 100 to deploy. During non-emergency conditions, privacy is maintained. The only time to record images is when something has occurred, and a user/computer may not be capable of sending a signal to camera system 100. Alarm system 1404 may include sensors or other means of compiling data to indicate a condition to deploy camera system 100, such as going onto auxiliary power, high temperature, loud noises and the like. Alarm system 1404 performs conventional alarm or warning functions, and sends a signal to transceiver 1410. Alternatively, alarm system 1404 may be wired directly to camera system 100 in the event system 1400 goes down.

FIGS. 15-21 depict another retractable camera system 1500 according to the disclosed embodiments. Camera system 1500 may be similar in function to camera systems 100 and 600 in that it fits into a recess in a ceiling, wall, enclosure and the like. Retractable camera system 1500, however, includes several differences from systems 100 and 600, as disclosed below. Retractable camera system 1500 may integrated into home security systems and wireless or mobile communication systems. For example, retractable camera system 1500 may be incorporated into the embodiments shown in FIG. 14.

Figure 15:
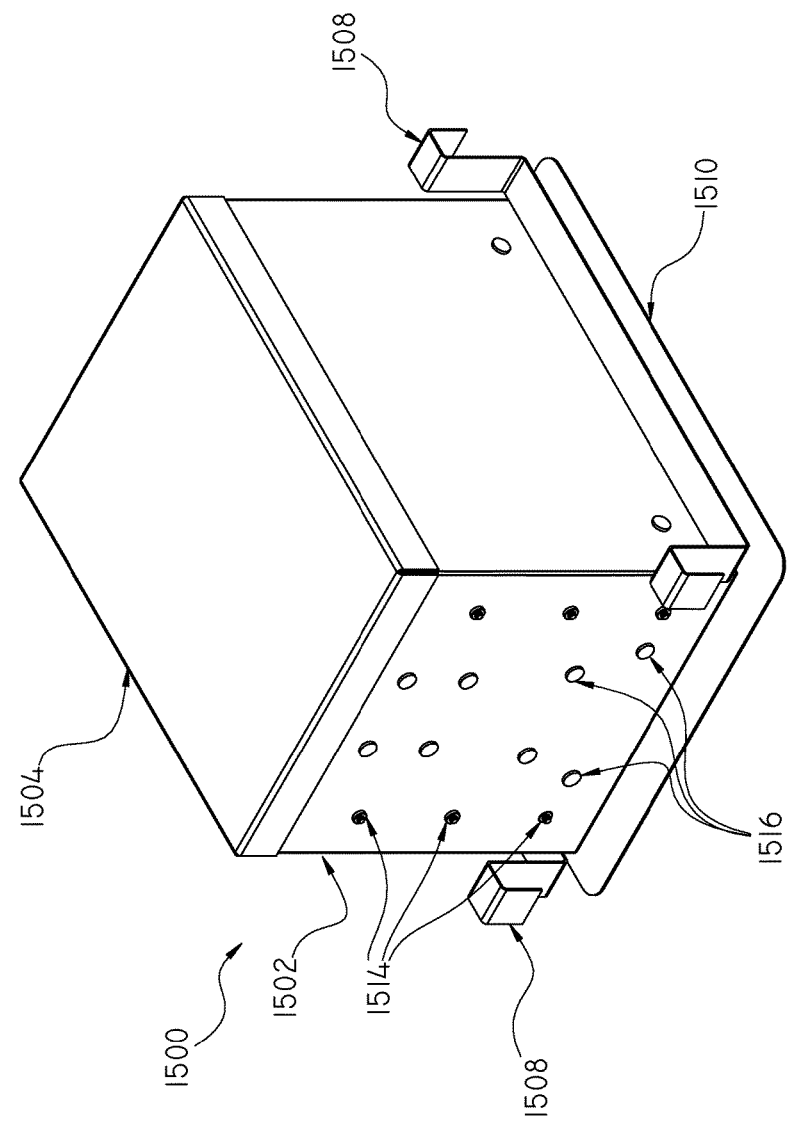
FIG. 15 illustrates a front-right side perspective view of another retractable camera system having an enclosure and a lid according to the disclosed embodiments.
Figure 16:
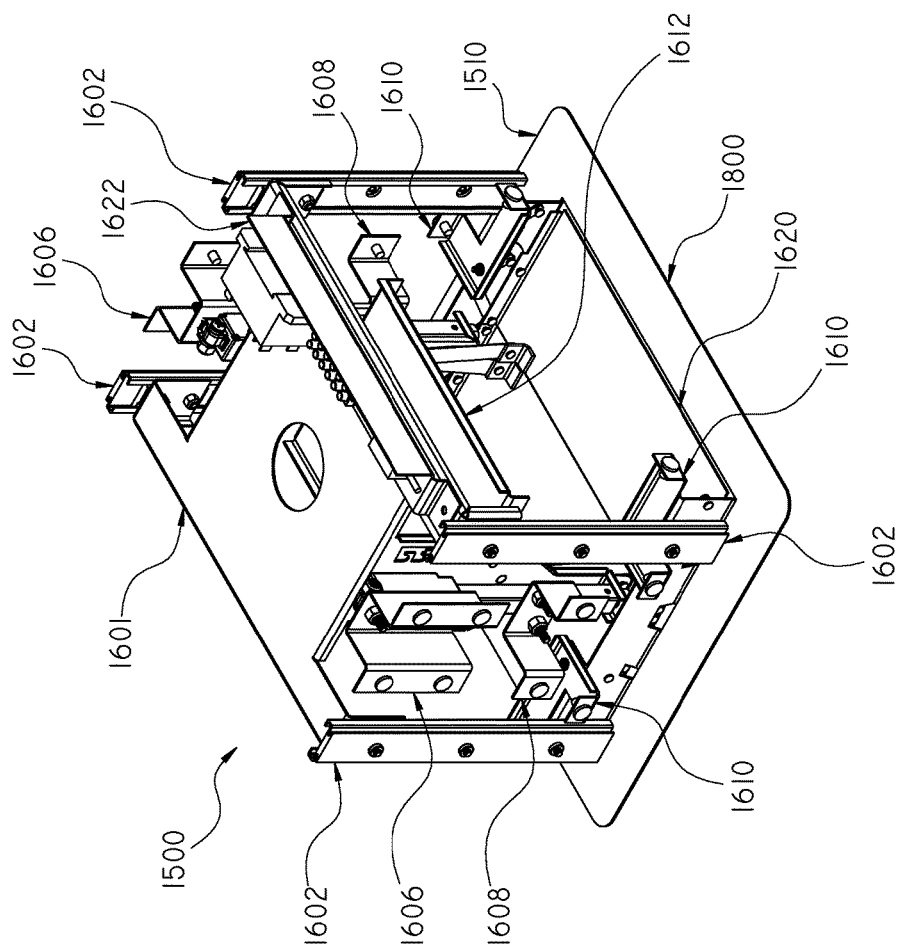
FIG. 16 illustrates a front-right side perspective view of the retractable camera system without the enclosure and the lid according to the disclosed embodiments.

FIG. 15 depicts a front-right side perspective view of retractable camera system 1500 having enclosure 1502 and lid 1504 according to the disclosed embodiments. FIG. 16 depicts a front-right side perspective view of retractable camera system 1500 without enclosure 1502 and lid 1504 according to the disclosed embodiments. Retractable camera system 1500 controls a retracting platform as it raises and lowers from the structure having the recess. A variety of small camera systems may be mounted and integrated onto the retracting camera platform.

Enclosure 1502 of retractable camera system 1500 is mounted using mounting brackets 1508 that are welded to the outside of the enclosure. Mounting brackets 1508 attach to braces inserted between the beams, or joists, of the ceiling or other structure. Mounting brackets 1508 may be made from galvanized steel. Enclosure 1502 and lid 1504 also may be made from galvanized steel.

Enclosure 1502 may include four sides that act at the main body to support the other components of retractable camera system 1500. In some embodiments, enclosure 1502 may use self-clinching nuts 1514 to attach to linear slide rails 1602 and blind rivets 1516 to attach to actuator attachment bracket 1606, actuator holding bracket 1608 and bezel attachment bracket assembly 1610. Enclosure 1502 has a rectangular hole 1620 cut into the center of the bottom of the enclosure to allow a camera, such as camera 604, to pass through. Enclosure 1502 preferably is suspended level with the top surface of the ceiling substrate. Lid 1504 is placed on top of enclosure 1502 prior to installation.

Lid 1504 keeps dust and other materials from entering enclosure 1502 that may interfere with the operation of retractable camera system 1500. Thus, using the assembly of enclosure 1502 and lid 1504, camera system 1500 may act like a box placed in a recess located in the ceiling or any other part of a building structure. Camera system 1500 may be mounted using mounting brackets 1508. This configuration reduces the need to mount each component of camera system 1500 separately, and also keeps debris away from the components within enclosure 1502 and lid 1504.

Platform 1601 is attached to four vertical linear slide rails 1602. As noted above, linear slide rails 1602 may be attached to enclosure 1502 by nuts 1514. Platform 1601 may be made from galvanized steel. Platform 1601 also holds a separate adjustable platform 1612 beneath it. Platforms 1601 and 1612 hold the camera system being used. Electronics bracket 1622 resides on top of platform 1601 to hold the electronics used with the camera system, disclosed in greater detail below.

Figure 17C:
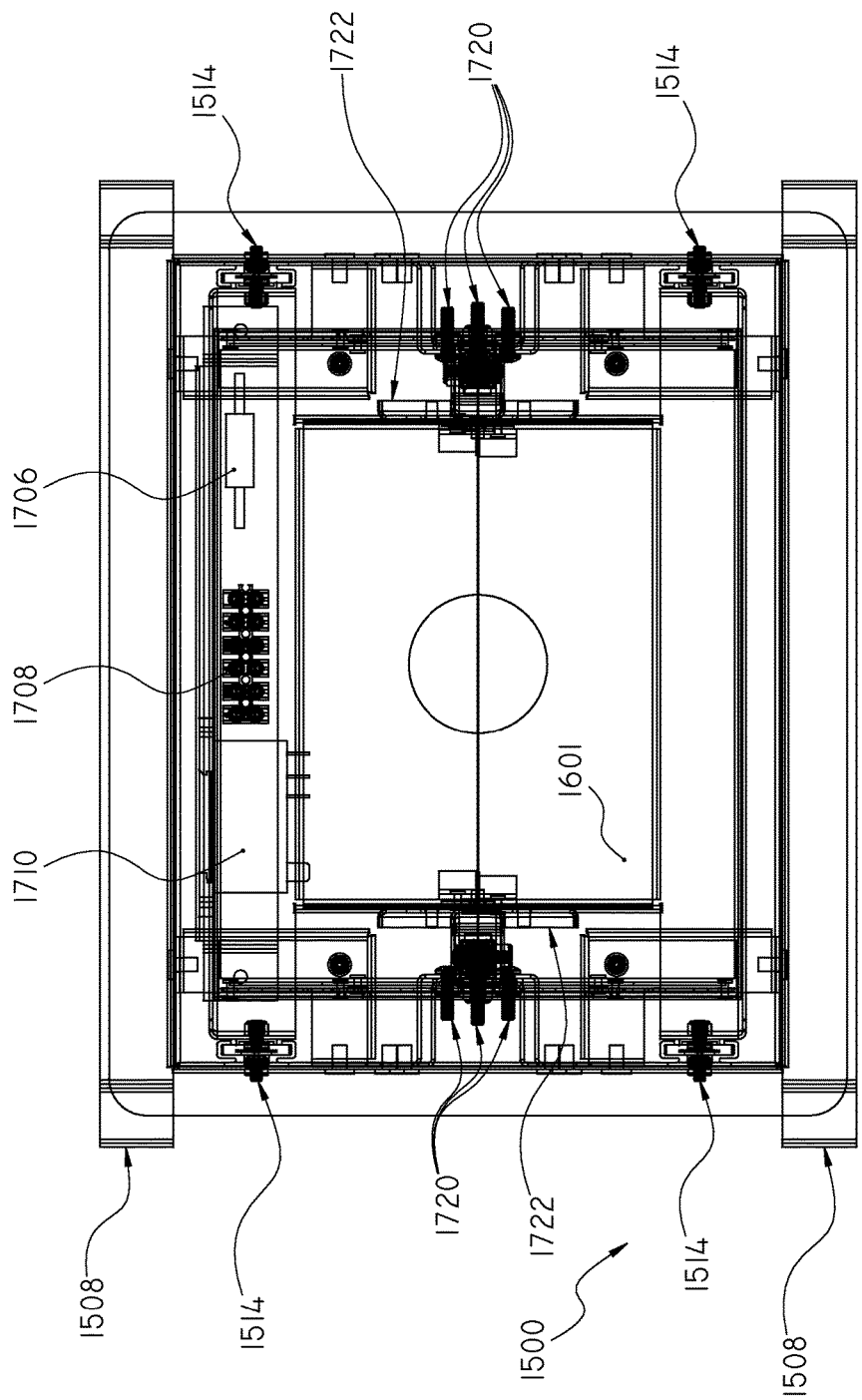
FIG. 17C illustrates a top view of the retractable camera system according to the disclosed embodiments.

FIG. 17A depicts a side view of retractable camera system 1500 with the doors open and the camera lowered. FIG. 17B depicts a side view of retractable camera system 1500 with the doors closed and the camera retracted into enclosure 1502. FIG. 17C depicts a top view of retractable camera system 1500 according to the disclosed embodiments.

Platform 1601 also is attached to two linear actuators 1702 held by actuator attachment bracket 1606 and actuator holding bracket 1608. The two linear actuators 1702 may be on opposite sides of enclosure 1502. Actuators 1702 are mounted to enclosure 1502 using actuator attachment bracket 1606, which is riveted to enclosure 1502. Linear actuators 1702 raise and lower platforms 1601 and 1612 using actuator rods 1704. Two actuators in these embodiments help balance out the power when lowering platforms 1601 and 1612. Thus, larger cameras and electronics may be accommodated as the motors within the actuators should not jam during operation. The load may be distributed between both actuators.

Electronics bracket 1622 is on platform 1601 and holds the electronics to operate retractable camera system 1500. These electronics may include relay 1710, terminal block 1708 and fuse holder 1706. Relay 1710 may cause actuators 1702 to extend and retract actuator rod 1704. Terminal block 1708 may allow for wire connections, electronics or power. Additional electronics may be located on electronics bracket 1622, such as a processor or memory to perform operations using camera system 1500.

A bezel attachment bracket assembly 1610 may be located in the corners of camera system 1500. Each assembly 1610 may attach to enclosure 1502 using blind rivets 1516.

Screws 1712 attach platform 1601 to platform brackets 1722. Platform brackets 1722 may be attached to actuator rods 1704 so that platform 1601 moves with the rods. When actuator rods 1704 extend downwards, then platform brackets 1722 move platform 1601 as well. Screws 1720 are used to mount linear actuators 1702, as shown in FIGS. 16 and 17A-C.

FIGS. 18 and 19A-C depict a lowering assembly 1800 of camera system 1500 according to the disclosed embodiments. Lowering assembly 1800 is attached to the structure of camera system 1500 mounted in enclosure 1502. Lowering assembly 1800 may be unattached from enclosure 1502 for access to the components of camera system 1500 housed within the enclosure. Specifically, lowering assembly 1800 may be attached to bezel attachment bracket assemblies 1610.

Lowering assembly 1800 opens doors 1806 and 1807 to allow adjustable platform 1612 to extend therethrough. Doors 1806 and 1807 open downward and parallel to the ceiling or wall. To achieve this motion, a set of linkages attach doors 1806 and 1807 to bezel 1804. Linkages, disclosed in greater detail below, are riveted to bezel 1804 and doors 1806 and 1807. Another set of linkages connect doors 1806 and 1807 to platform bracket 1722 that is attached to linear actuators 1702. When actuators 1702 lower platform bracket 1722 and platform 1601, the other set of linkages push doors 1806 and 1807 open. When actuators 1702 raise platform bracket 1722 and platform 1601, doors 1806 and 1807 are closed. These linkages are riveted to doors 1806 and 1807 and screwed to platform bracket 1722. The doors, linkages and bezel may be made from galvanized steel.

Referring to FIG. 18, bezel 1804 includes flat portion 1802. Flat portion 1802 may be substantially flush with the ceiling or wall housing camera system 1500. Bezel 1804 may include two portions opposite each other that form a substantial L-shape extending away from flat portion 1802. The L-shaped portions serve to support first linkages 1808 and second linkages 1810, and to attach to bezel attachment bracket assemblies 1610. Thus, bezel 1804 may attach lowering assembly 1800 without much hassle and easily. Bezel 1804 also may be removed easily from enclosure 1502.

Third linkages 1812 are attached to doors 1806 and 1807. Preferably, there are two sets of third linkages 1812. As noted above, third linkages 1812 may extend upwards into enclosure 1502 to be attached to platform bracket 1722. As platform bracket 1722 is lowered, third linkages 1812 press doors 1806 and 1807 downward to deploy camera system 1500.

First linkages 1808 are attached to bezel 1804 and doors 1806 and 1807. Preferably, there are two sets of two first linkages 1808. First linkages 1808 serve as the inner set of linkages for lowering assembly 1800. Second linkages 1810 also are attached to bezel 1804 and doors 1806 and 1807, but are the outer set of linkages for lowering assembly 1800. Preferably, there are two sets of two second linkages 1810. In some embodiments, first linkages 1808 and second linkages 1810 differ in shape.

Figure 19A:
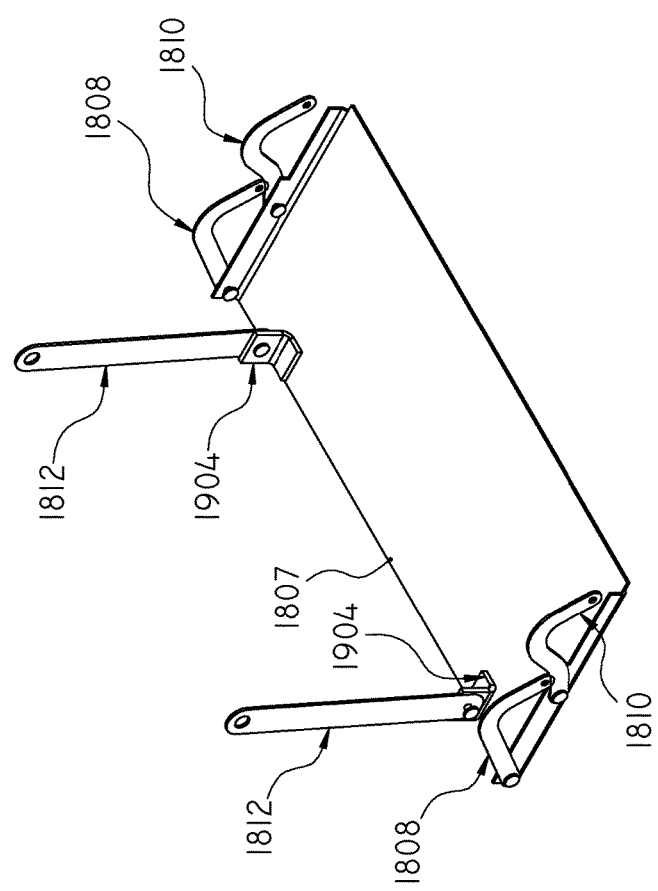
FIG. 19A illustrates a front-right side perspective view of a door with linkages according to the disclosed embodiments.
Figure 19B:
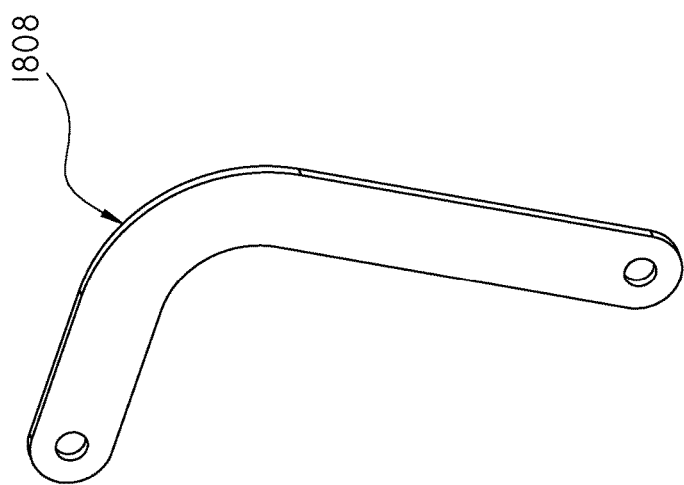
FIG. 19B illustrates a linkage piece for the lowering assembly according to the disclosed embodiments.
Figure 19C:
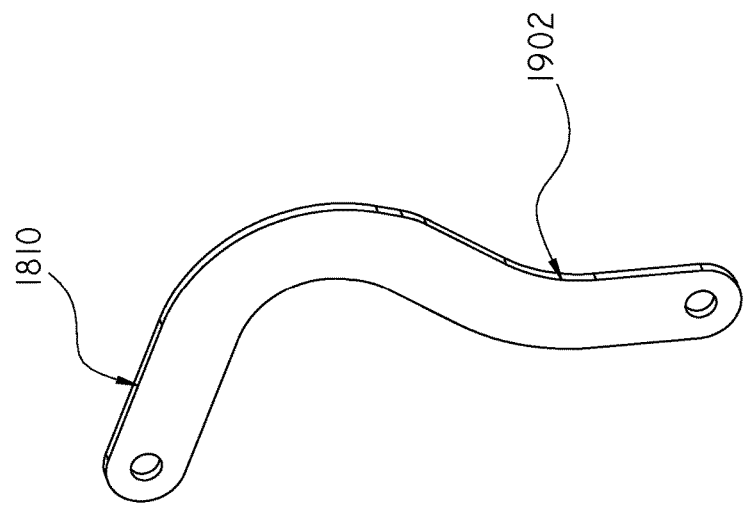
FIG. 19C illustrates another linkage piece for the lowering assembly according to the disclosed embodiments.

Referring to FIGS. 19A-C, the linkages of lowering assembly 1800 may be seen in greater detail. FIG. 19A depicts door 1807 attached to its associated linkages. The same configuration may be used for door 1806. Although FIGS. 19A-C show one door of lowering assembly 1800, the disclosed configuration may be applicable for both doors. Door 1806 includes attachments to the same linkages of those shown with door 1807. As shown, first linkages 1808, depicted in FIG. 19B, have a curved shape with one of its ends attached to door 1807. The free ends of first linkages 1808 are attached to bezel 1804.

Second linkages 1810, depicted in FIG. 19C, also have a curved shape with one end attached to door 1807 and the free end attached to bezel 1804. Second linkages 1810, however, include inwardly curved portion 1902. As can be seen in FIG. 19A, the end of a first linkage 1808 attached to bezel 1804 may fit into inwardly curved portion 1902 of second linkage 1810. This feature allows the linkages to fit together and not interfere when camera system 100 is lowered.

Third linkage 1812 is attached to door 1807 inwardly of first linkage 1808 and second linkage 1810. Third linkage 1812 may be attached to door 1807 by placing the end that the bottom on the inside of the L-shaped portion of bezel 1804 and aligning the hole of the third linkage with the right most hole of door 1807, or the hole to receive first linkage 1808. A tab 1904 may be used on door 1807 to secure each third linkage 1812. A washer may be placed between tab 1904 and third linkage 1812 and secured using a blind rivet.

Using the linkages disclosed above, lowering assembly 1800 is about to move doors 1806 and 1807 downwards and then back up to keep the doors parallel to the ceiling housing camera system 1500. In a wall mounted embodiment, doors 1806 and 1807 may move outwards from the wall, and then stay parallel to the wall. This feature is shown in FIGS. 20A and 21.

FIG. 20A depicts a bottom perspective view of retractable camera system 1500 in a lowered configuration according to the disclosed embodiments. As can be seen, adjustable platform 1612 is lowered through the opening created by doors 1806 and 1807. The components of system 1500 are housed within enclosure 1502 and lid 1504 so that only the deployed part of the system is exposed. A camera may fit through the aperture in platform 1612.

FIG. 20B depicts a bottom perspective view of retractable camera system 1500 in a retracted configuration according to the disclosed embodiments. System 1500 is enclosed and shut from the outside. Doors 1806 and 1807 fit within rectangular hole 1620 in lowering assembly 1800. No components of camera system 1500 are exposed. This appearance provides a flush, compact look to camera system 1500 without it being noticeable.

FIG. 21 depicts a front view of the retractable camera system 1500 in a lowered configuration according to the disclosed embodiments. The front view shows the components of camera system 1500 with a section of enclosure 1502 cut away. Thus, linear actuator 1702 on the front side of camera system 1500 is shown with actuator rod 1704 moved in the downward position. This deployment engages the components of lowering assembly 1800 to move first linkages 1808, second linkages 1810 and third linkages 1812 to move doors 1806 and 1807 to a position shown in FIG. 21.

Preferably, the linkages and doors move downwards and then back up towards the ceiling. This motion improves on just moving doors 1806 and 1807 perpendicular to the ceiling. It also places door 1806 and 1807 flat or flush against the ceiling so as to not block the view of a deployed camera. A space 2102 is formed on each side of camera system 1500. Spaces 2102 are where the ceiling would be located so that doors 1806 and 1807 are flush against the ceiling. Alternatively, spaces 2102 may accommodate a wall. Thus, camera system 1500 may be installed easily by placing enclosure 1502 and lid 1504 into a hole or compartment in the ceiling. Lower assembly 1800 covers the hole in the ceiling with flat portion 1802. Lower assembly 1800 also easily attaches to the appropriate brackets and components within enclosure 1502 without the need for being mounted on the ceiling. These features provide for easier installation.

Figure 23:
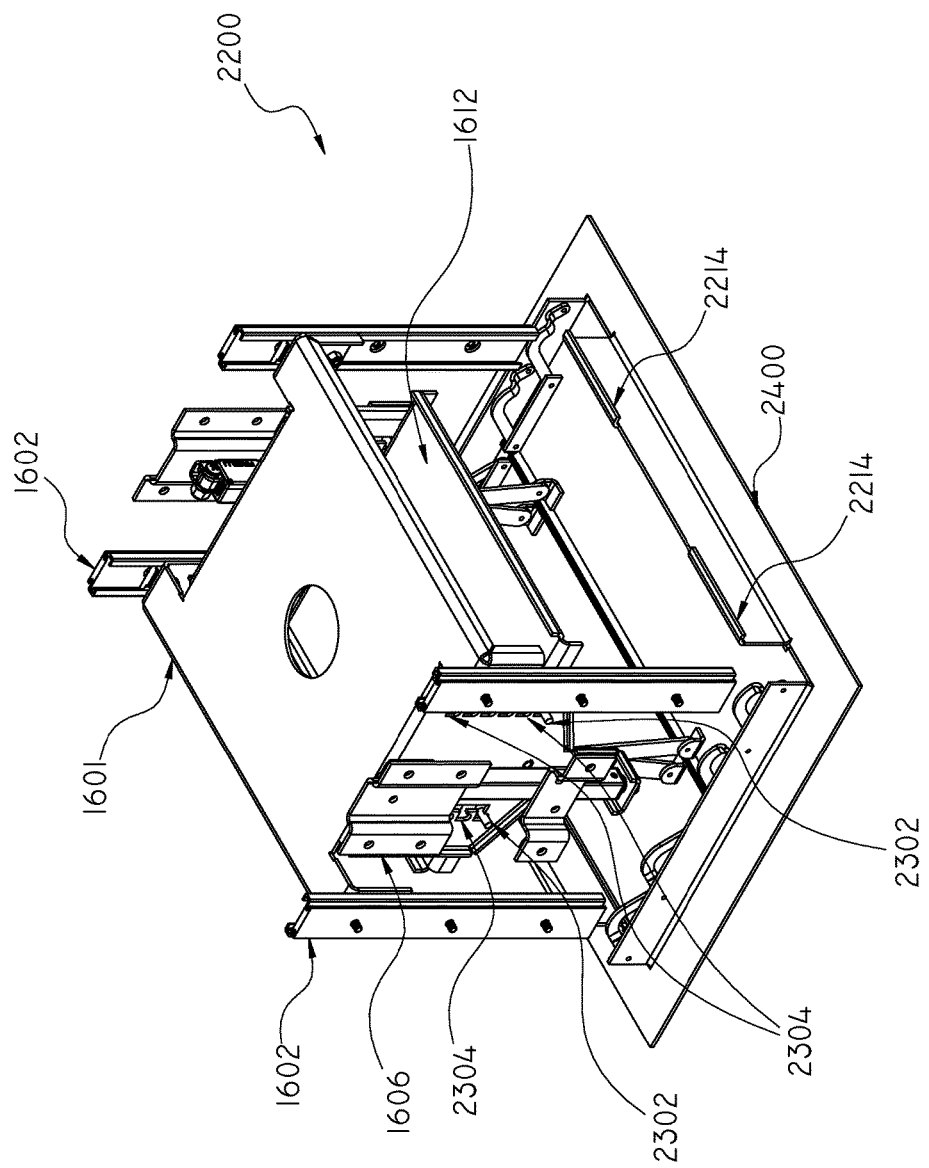
FIG. 23 illustrates a front-right perspective view of the retractable camera system without the enclosure according to the disclosed embodiments.

FIGS. 22-28 depict another retractable camera system 2200 according to the disclosed embodiments. FIG. 22 depicts a front-right side perspective view of retractable camera system 2200 having enclosure 2202 according to the disclosed embodiments. FIG. 23 depicts a front-right side perspective view of retractable camera system 2200 without enclosure 2202 according to the disclosed embodiments. Like retractable camera system 1500 disclosed above, retractable camera system 2200 controls a retracting platform as it raises and lowers from the structure having the recess. A variety of small camera systems may be mounted and integrated onto the retracting camera platform. Many components are similar between camera systems 1500 and 2200, and are not repeated in the disclosure below. Instead, the disclosure focuses on those aspects of the embodiments shown in FIGS. 22-28 that differ from those shown in FIGS. 15-21.

Retractable camera system 2200, however, does not include a lid to cover the top of enclosure 2202. Enclosure 2202 may be composed of a unitary construction so that it is placed in a hole in the ceiling or wall. Preferably, retractable camera system 2200 is mounted using the disclosed assembly. Enclosure 2202 also includes bend portion 2254 on two opposing sides of the enclosure.

Retractable camera system 2200 includes lowering assembly 2400, disclosed in greater detail below. Like lowering assembly 1800, lowering assembly 2400 attaches to enclose 2202 and serves to open doors 1806 and 1807 to allow the camera to lower or extend out of enclosure 2200. Tabs 2214 of lowering assembly 2400 are inserted through slots 2213 of enclosure 2202. Lowering assembly 2400, however, does differ from lowering assembly 1800, as disclosed in detail with regard to FIG. 24.

Enclosure 2202 includes a mounting assembly using tightening screw holders 2206. Screw holders 2206 may be on opposing sides of enclosure 2202, in two sets of two screw holders. Preferably, screw holders 2206 are welded to enclosure 2202 to provide support for camera system 2200 when mounted. Screws 2208 are received into screw holders 2206 and secured with hex nuts 2210. Each of screws 2208 also insert and extend through a tightening foot 2212. As shown in FIG. 22, tightening foot 2212 includes a tab 2250 that couples with screw 2208 in a portion 2252 of screw holders 2206. Tab 2250 extends a set distance away from bend portion 2254 such that screw 2208 inserts through the bend portion and the tab when connected to screw holder 2206.

The operation of mounting camera system 2200 using the mounting assembly having these components is explained. Enclosure 2200 is placed into the ceiling or wall. Screws 2208 are used to lower or raise tightening feet 2212. A screwdriver is used to twist screws 2208 to clamp the tightening feet. Tightening feet 2212 clamp down on the ceiling or structural material to secure or support enclosure 2202. The heads of screws 2208 abut against the inside of enclosure 2202 against bend portion 2254. As shown in FIG. 22, four assemblies of a screw holder 2206, a screw 2208, a hex nut 2210, and a tightening foot 2212 are used. Of these components, screw 2208, hex nut 2210, and tightening foot 2212 are removable from enclosure 2202.

Referring to FIG. 23, camera system 2200 is shown without enclosure 2202. For the most part, these features of camera system 2200 correspond to the same features of camera system 1500 shown in FIG. 16. The same actuator-enabled architecture is used to lower the camera system and associated electronics, except with the differences disclosed below. Lowering assembly 2400, however, is shown with tabs 2214 that engage enclosure 2202 and other features that differ from lowering assembly 1800.

Adjustable platform 1612 also is shown. Platform 1612 may be adjusted in a vertical direction. This allows the camera to be lowered at different "heights" which can accommodate varying sizes of cameras. For example, platform 1612 may be lowered for a smaller-sized camera so that it clears the ceiling level. Camera system 2200 uses pins 2302 and tabs 2304 to set a position for platform 1612. Pins 2302 may be pressed inward to move between tabs 2304. Pins 2302 and tabs 2304 may be on one side of platform 1612, or, alternatively, on both sides of the platform.

Figure 24:
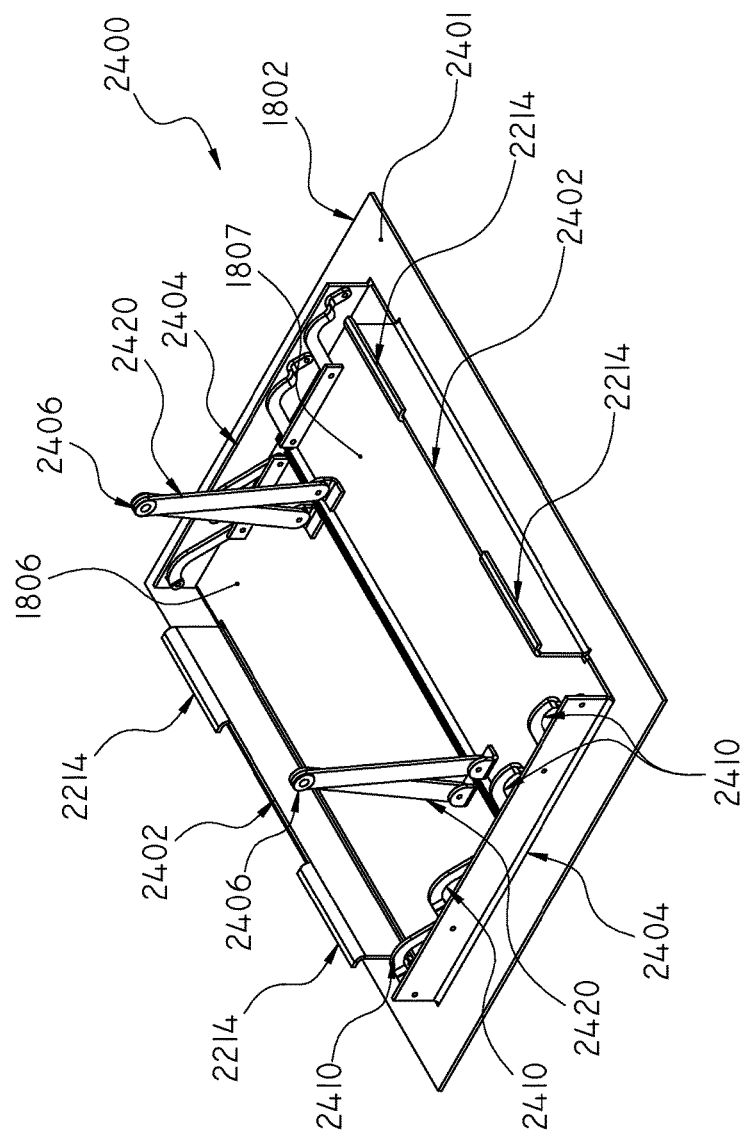
FIG. 24 illustrates a front-right side perspective view of a lowering assembly for the retractable camera system according to the disclosed embodiments.

FIG. 24 depicts lowering assembly 2400 of camera system 2200 according to the disclosed embodiments. Those components common to lowering assemblies 1500 and 2400 are not disclosed in detail with regard to FIG. 24. Lowering assembly 2400 is attached to the structure of camera system 2200 mounted in enclosure 2202. Lowering assembly 2400 may be detached from enclosure 2202 for access to the components of camera system 2200 housed within the enclosure. Specifically, lowering assembly 2400 may be attached to enclosure 2202 using slots 2213 and tabs 2214.

Lowering assembly 2400 includes a bezel 2401 comprised of support bars 2402 and linkage bars 2404. Support bars 2402 include tabs 2214 and are on opposing sides of lowering assembly 2400, preferably extending lengthwise along flat portion 1802. Support bars 2402 may support the weight of lowering assembly 2400. Linkage bars 2404 are attached to linkages 2410, disclosed in greater detail below. Linkage bars 2404 may be on opposing sides of lowering assembly 2400 and extend along the widthwise portion of flat portion 1802.

Flat portion 1802 may be included as part of bezel 2401. Flat portion 1802 may be substantially flush with the ceiling or wall that houses camera system 2200. Flat portion 1802 may be made flush using the assembly shown in FIG. 22 by adjusting screws 2208.

Linkages 2410 are riveted to linkage bars 2404 and doors 1806 and 1807. Linkages 2410 may be identical in shape and used in two sets of four linkages. Each set of four includes two linkages attached to door 1806 and two linkages attached to door 1807. When actuators 1702, as shown in FIGS. 17A-C, lower platform bracket 1722 and platform 1601, linkages 2410 along with linkages 2420 push open doors 1806 and 1807.

Figure 28A:
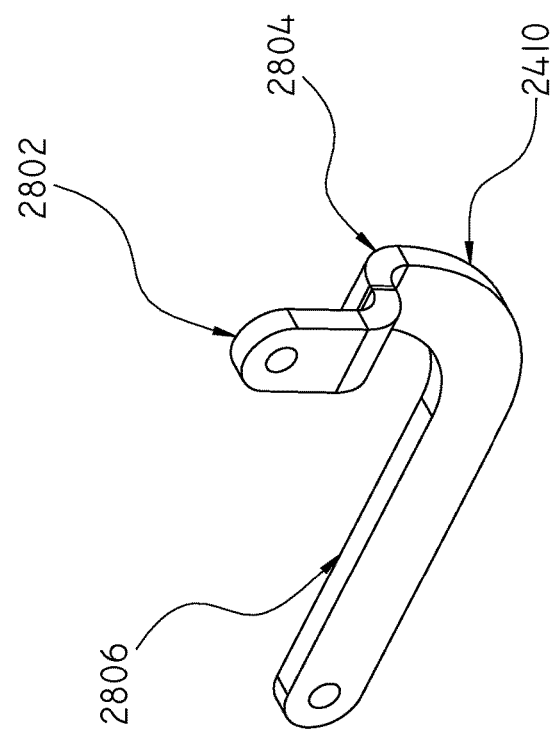
FIG. 28A illustrates a front view of a linkage used in the retractable camera system according to the disclosed embodiments.
Figure 28B:
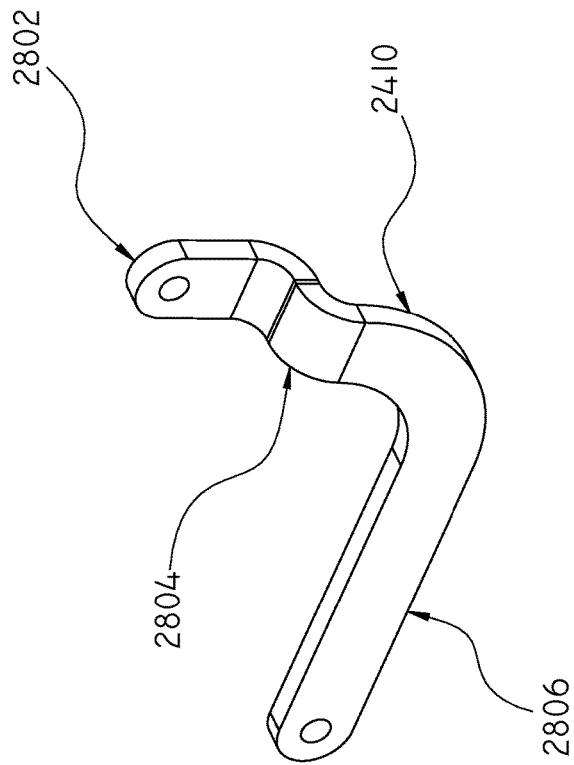
FIG. 28B illustrates a front view of another linkage used in the retractable camera system according to the disclosed embodiments.

Linkages 2410 may be shown in greater detail by FIGS. 28A and 28B. FIGS. 28A and 28B depict linkages 2410 used in camera system 2200 according to the disclosed embodiments. The difference between the two views as that linkage 2410 shown in FIG. 28A is for a door on one side of lowering assembly 2200 and the one shown in FIG. 28B is for a door on the other side. Linkages 2410 include a top portion 2802 that connects to linkage bars 2404 and a bottom portion 2806 that connects to the respective door. Curved portion 2804 is located between top portion 2802 and bottom portion 2806. Curved portion 2804 allows linkages 2410 to be located in close proximity to each other without interference during opening and closing the doors. It also provides a clearance for linkage 2410 to move.

Linkages 2420 may operate like third linkages 1812 shown in FIG. 18. As the camera is lowered, linkages 2420 also are pressed downwards. Linkages 2420 include grommets 2406 to connect to platform bracket 1722. Grommets 2406 preferably are two piece grommets that, more preferably, fit a 5/32 inch screw. Linkages 2420 also are attached to doors 1806 and 1807, as shown.

FIG. 25 depicts a bottom perspective view of retractable camera system 2200 in a retracted configuration according to the disclosed embodiments. System 2200 is enclosed in a recess and not visible from outside, such as in a room. Lowering assembly 2400 may be seen with doors 1806 and 1807 shut. This appearance provides a flush, compact look to camera system 2200 without being noticeable.

FIG. 26 depicts a bottom perspective view of retractable camera system 2200 in a lowered configuration according to the disclosed embodiments. As can be seen, adjustable platform 1612, shown in FIG. 16, is lowered through the opening created by doors 1806 and 1807. FIG. 27 depicts a right side view of retractable camera system 2200 in the lowered configuration according to the disclosed embodiments. As can be seen, tightening feet 2212 extend outwardly from enclosure 2202 to secure camera system 2400 to the ceiling, beam, or other structural component.

Thus, a retractable camera platform system is disclosed that includes an enclosed assembly that lowers a platform along with an adjustable platform to lower a camera. Doors move to be flush against the surface of the ceiling using linkages within a lowering assembly. The camera platform system includes two linear actuators to balance the load when lowering or retracting the platforms. Linear slide rails help move the assembly down and up. When retracted, the doors of the lowering assembly are closed to provide a hidden configuration.

Thus, a camera system with added functionality is disclosed. The disclosed system allows a user, company, authority, maintenance and the like to maintain privacy by keeping the camera system within a recess until needed. Upon receiving an instruction to record an image, the camera system exits the recess using a frame structure to move the camera out into the open. A cover, doors or door assembly is moved in conjunction with the camera to allow deployment. Otherwise, these items cover a hole created for the camera to keep it hidden or out of view.

The camera system is mounted to the ceiling or structure using screw holder mounted on the enclosure. The screw holders receive screws that directed upward through holes in two bends of the enclosure. The bends may be on opposite sides of the enclosure. The screws also insert through tightening feet that are detached from the enclosure. The tightening feet may be clamped to the ceiling or structure using the screws. Thus, the camera system is made flush for a nice appearance.

These features especially are important for security measures. When retracted out of view, the camera is not readily discernible. An intruder would not be aware of its presence, unlike fixed cameras out in the open. The frame structure allows an actuator to move the camera with the need for large bulking motors or assemblies. Thus, the camera is lowered for use without causing distraction or attention to itself. Using the intruder example, the camera may be deployed without notice to capture images of the intruder. The intruder may not disable the camera because he does not know about it.

It will be readily apparent to those skilled in the art that various modifications can be made in the disclosed embodiments of the camera system without departing from the spirit or the scope of the invention. Thus, it is intended that the present disclosure covers any modifications or variations of the embodiments disclosed herein provided that the modifications and variations come within the scope of the claims and their equivalents.

The invention claimed is:

1. A retractable camera platform system comprising:
an enclosure;
two linear actuators attached to sides of the enclosure;
a first platform to lower and retract a camera that is movable by the two linear actuators;
a plurality of linear slide tracks attached on opposite sides of the enclosure to guide the first platform during movement; and
a lowering assembly attached to the enclosure having a bezel mounted to the enclosure, two doors to open and close according to the two linear actuators, and
two sets of linkages to attach the two doors to the bezel and to guide the two doors, wherein the two sets of linkages differ in shape.

2. The retractable camera platform system of claim 1, wherein the lowering assembly is attached to the enclosure using bezel attachment brackets.

3. The retractable camera platform system of claim 1, wherein each of the two linear actuators is attached to the enclosure by an actuator attachment bracket.

4. The retractable camera platform system of claim 1, further comprising a second platform underneath the first platform.

5. The retractable camera platform system of claim 4, wherein the second platform is an adjustable platform.

6. The retractable camera platform system of claim 4, wherein the second platform holds the camera.

7. The retractable camera platform system of claim 1, wherein the two sets of linkages include first linkages and second linkages and further wherein the second linkages include an inwardly curved portion.

8. The retractable camera platform system of claim 7, further comprising third linkages, wherein the third linkages include ends attached to each door.

9. The retractable camera platform system of claim 1, further comprising mounting brackets attached to the enclosure.

10. A retractable camera system comprising:
an enclosure;
a main platform and an adjustable platform, wherein the adjustable platform holds a camera and the main platform holds a component to operate the camera, and wherein the main platform and the adjustable platform are separate platforms, wherein the adjustable platform is configured to be adjusted in a vertical direction relative to the main platform;
at least one linear actuator to move the main platform and the adjustable platform;
track means attached to the enclosure to guide the main platform when moved by the at least one linear actuator;
a bezel attached to the enclosure; and
at least one door coupled to the bezel by a plurality of different linkages.

11. The retractable camera system of claim 10, wherein the plurality of different linkages include a set of first linkages and a set of second linkages.

12. The retractable camera system of claim 11, wherein the set of second linkages include inwardly curved portions to fit ends of the first set of linkages.

13. The retractable camera system of claim 10, wherein the bezel is attached to at least one bracket attached to the enclosure.

14. The retractable camera system of claim 10, wherein the at least one linear actuator includes two linear actuators attached on opposite sides of the enclosure.

15. The retractable camera system of claim 10, further comprising at least one actuator rod attached to the at least one linear actuator, where the at least one actuator rod moves the at least one door.

16. The retractable camera system of claim 10, wherein the plurality of different linkages guide at the least one door to a position substantially parallel with a surface housing the enclosure.

17. A retractable camera system comprising:
an enclosure, wherein the enclosure includes a mounting assembly comprising
a plurality of screw holders to receive screws that insert through holes in the enclosure, and
a plurality of tightening feet that extend away from the enclosure and configured to receive the screws therethrough;
two linear actuators attached to the enclosure;
a platform to lower and retract a camera that is movable by the two linear actuators;
a plurality of linear slide tracks attached to the enclosure to guide the platform during movement; and
a lowering assembly attached to the enclosure using a plurality of tabs inserted into slots within the enclosure, the lowering assembly having
a bezel mounted to the enclosure,
two doors to open and close according to the two linear actuators, and
linkages to attach the two doors to the bezel and to guide the two doors.

18. The retractable camera system of claim 17, wherein the plurality of screw holders are welded to the enclosure.

19. The retractable camera system of claim 17, wherein the plurality of screw holders include curved portions to accommodate the screws.

20. The retractable camera system of claim 17, wherein the linkages includes at least two different sets of linkages.

* * * * *